United States Patent
Nishida et al.

(10) Patent No.: US 6,505,476 B1
(45) Date of Patent: Jan. 14, 2003

(54) REFRIGERANT CYCLE SYSTEM WITH SUPER-CRITICAL REFRIGERANT PRESSURE

(75) Inventors: Shin Nishida, Mishima (JP); Motohiro Yamaguchi, Hoi-gun (JP); Satoshi Itoh, Kariya (JP); Yasutaka Kuroda, Anjo (JP); Yoshitaka Tomatsu, Chiryu (JP); Yasushi Yamanaka, Nakashima-gun (JP); Yukikatsu Ozaki, Gamagori (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 09/694,378

(22) Filed: Oct. 23, 2000

(30) Foreign Application Priority Data

Oct. 28, 1999 (JP) ............................................ 11-307493
Jan. 21, 2000 (JP) ........................................ 2000-017816
Mar. 28, 2000 (JP) ........................................ 2000-093013

(51) Int. Cl.[7] .............................. F25B 49/00; F25B 1/00
(52) U.S. Cl. .......................... 62/228.5; 62/210; 62/222
(58) Field of Search ................................. 62/228.5, 203, 62/204, 208, 209, 210, 211, 222

(56) References Cited

U.S. PATENT DOCUMENTS 5,685,160 A  * 11/1997 Abersfelder et al. .......... 62/114

FOREIGN PATENT DOCUMENTS

JP  7-294033  11/1995
JP  10-19421  1/1998

* cited by examiner

Primary Examiner—Denise L. Esquivel
Assistant Examiner—Marc Norman
(74) Attorney, Agent, or Firm—Harness, Dickey & Pierce, PLC

(57) ABSTRACT

In a refrigerant cycle system, a control unit controls both a refrigerant amount discharged from a compressor and an opening degree of a pressure control valve so that theoretical efficiency of a super-critical refrigerant cycle and efficiency of the compressor are improved. Therefore, the effective coefficient of performance of the refrigerant cycle is improved, while necessary capacity of components of the refrigerant cycle is obtained.

19 Claims, 30 Drawing Sheets

REFRIGERANT CYCLE SYSTEM WITH SUPER-CRITICAL REFRIGERANT PRESSURE

CROSS-REFERENCE TO RELATED APPLICATION

This application is related to and claims priority from Japanese Patent Applications No. Hei. 11-307493 filed on Oct. 28, 1999, No. 2000-17816 filed on Jan. 21, 2000 and No. 2000-93013 filed on Mar. 28, 2000, the contents of which are hereby incorporated by reference.

BACKGROUND OF THE INVENTION

1. Field of the Invention

The present invention generally relates to a refrigerant cycle system with a super-critical refrigerant pressure, more particularly, relates to control operation of both a compressor and a pressure control valve of the refrigerant cycle system.

2. Description of Related Art

In a conventional super-critical refrigerant cycle described in JP-A-7-294033, an opening degree of a decompressing unit is controlled based on a refrigerant temperature at an outlet side of a radiator. When capacity of the super-critical refrigerant cycle is controlled only by the decompressing unit (i.e., pressure control valve), it is necessary to increase a refrigerant pressure at a high-pressure side by reducing the opening degree of the decompressing unit for increasing the capacity (e.g., cooling capacity and heating capacity). However, when the refrigerant pressure at the high-pressure side is increased, the efficiency of a compressor is decreased, and effective coefficient of performance of the super-critical refrigerant cycle is deteriorated.

SUMMARY OF THE INVENTION

In view of the foregoing problems, it is an object of the present invention to provide a refrigerant cycle system which provides necessary capacity of components of a super-critical refrigerant cycle while preventing coefficient of performance of the super-critical refrigerant cycle from being deteriorated.

According to the present invention, a refrigerant cycle system includes a compressor for compressing refrigerant and discharging refrigerant with a pressure higher than the critical pressure, a radiator for cooling refrigerant discharged from the compressor, a pressure control valve for decompressing refrigerant flowing from the radiator and being disposed to control a pressure of high-pressure side refrigerant from the compressor to a position before being decompressed, an evaporator for evaporating refrigerant decompressed in the pressure control valve, and a control unit which controls both a refrigerant amount discharged from the compressor and an opening degree of the pressure control valve. Because the control unit controls the refrigerant amount discharged from the compressor while controlling the opening degree of the pressure control valve, necessary capacity of components can be obtained in the refrigerant cycle, and coefficient of performance of the refrigerant cycle is prevented from being deteriorated.

Preferably, the control unit controls the refrigerant amount discharged from the compressor and the opening degree of the pressure control valve based on based on theoretical coefficient of performance of the refrigerant cycle and efficiency of the compressor. Therefore, the coefficient of performance of the refrigerant cycle can be improved while efficiency of the compressor can be improved.

Effective coefficient of performance of the refrigerant cycle is calculated based on a moving heat quantity moved from the evaporator to the radiator of the refrigerant cycle and a consumed power consumed by the compressor, and the control unit controls the refrigerant amount discharged from the compressor and the opening degree of the pressure control valve based on the calculated effective coefficient of performance of the refrigerant cycle. Therefore, the effective coefficient of performance of the refrigerant cycle can be improved.

Preferably, the control unit controls at least one of the refrigerant amount discharged from the compressor and the opening degree of the pressure control valve so that the temperature of high-pressure side refrigerant is lower than a predetermined temperature. Therefore, it can prevent the components of the refrigerant cycle from being troubled by heat.

Preferably, the control unit controls the refrigerant amount discharged from the compressor and the opening degree of the pressure control valve so that a driving torque of the compressor is lower than a predetermined torque. Therefore, the refrigerant cycle can obtain a predetermined capacity while it can prevent the driving torque of the compressor from being excessively increased.

When a temperature difference, between a refrigerant temperature at an outlet of the radiator and a temperature of a fluid passing through the radiator to perform a heat exchange with refrigerant, is equal to or larger than a predetermined temperature difference, the control unit controls the pressure control valve to have a refrigerant pressure at the outlet of the radiator, larger than a target refrigerant pressure determined based on the refrigerant temperature at the outlet of the radiator, while controlling the refrigerant amount discharged from the compressor to be decreased. Therefore, heat-exchanging effect of the radiator is improved while heating capacity due to the radiator can be prevented from being lowered.

Preferably, when the refrigerant cycle system is applied to an air conditioner, the control unit controls the refrigerant amount discharged from the compressor, while controlling the pressure control valve so that the pressure of the high-pressure side refrigerant becomes a target pressure determined based on temperature of outside air, when outside air is introduced into the radiator through an outside air passage. Therefore the control of the pressure control valve can be made simple.

Further, the refrigerant cycle system further includes an accumulator having a tank portion into which refrigerant from the evaporator flows to be separated into gas refrigerant and liquid refrigerant, and a flow control member for controlling an amount of liquid fluid, including lubrication oil and liquid refrigerant, flowing from the accumulator to the compressor. The tank portion of the accumulator has an upper outlet through which the gas refrigerant is sucked into the compressor from an upper side of the tank portion, and a lower outlet through which the liquid fluid is sucked into the compressor from a lower side of the tank portion. In the refrigerant cycle system, the flow control member controls the amount of liquid fluid flowing from the lower side of the tank portion into the compressor. Therefore, the lubrication oil contained in the liquid fluid can be variably supplied to the compressor from the accumulator in accordance with the rotation speed of the compressor or the refrigerant amount discharged from the compressor. Because the liquid fluid supplied from the accumulator to the compressor is increased when the refrigerant temperature discharged from the compressor is increased, it can prevent the compressor from being troubled even when the temperature of refrigerant discharged from the compressor is greatly increased.

BRIEF DESCRIPTION OF THE DRAWINGS

Additional objects and advantages of the present invention will be more readily apparent from the following detailed description of preferred embodiments when taken together with the accompanying drawings, in which:

FIG. 36B is a schematic view of a mechanical flow control valve according to the nineteenth embodiment; and.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be now described with reference to FIGS. 1–10. In the first embodiment, a super-critical refrigerant cycle of the present invention is typically applied to an air conditioner for heating.

Figure 1:
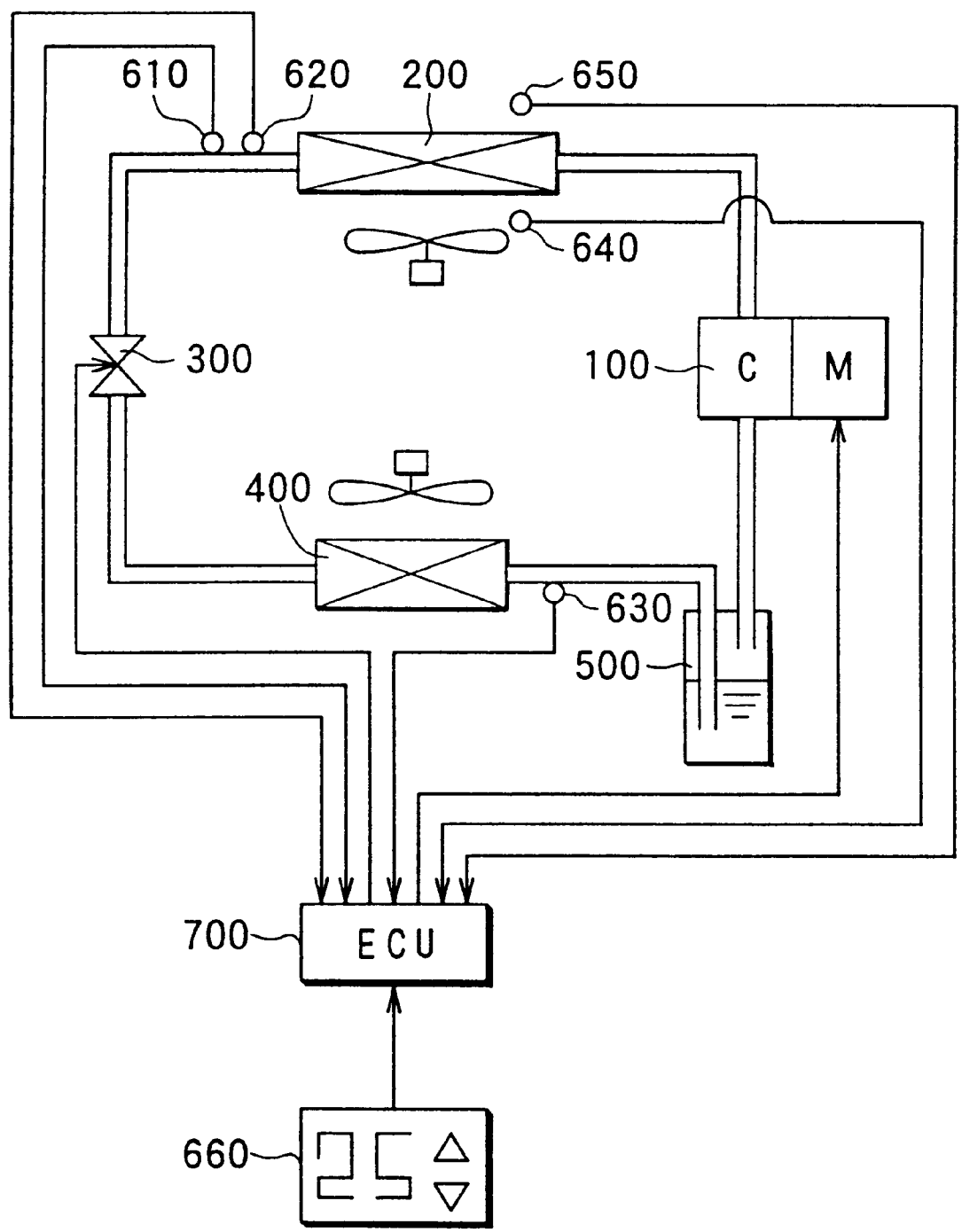
FIG. 1 is a schematic diagram of a super-critical refrigerant cycle according to a first preferred embodiment of the present invention.

In FIG. 1, a compressor 100 for sucking and compressing refrigerant (e.g., carbon dioxide) is driven by a synchronous electrical motor M. In the first embodiment, as shown in FIG. 1, the compressor 100 and the electrical motor M are integrated to form an integrated electrical compressor. The electrical motor M is variably controlled by an inverter so that generation torque of the electrical motor M is controlled by current of the inverter and a rotation speed thereof is controlled by a current frequency of the inverter.

Refrigerant discharged from the compressor 100 flows into a radiator 200. Air passing through the radiator 200 is heated by performing a heat exchange between inside air inside a compartment and refrigerant flowing through the radiator 200. In the radiator 200, refrigerant pressure (i.e., high-pressure side refrigerant pressure) becomes equal to or higher than the critical pressure of refrigerant. Refrigerant flowing from the radiator 200 is decompressed by a pressure control valve 300. By electrically adjusting an opening degree of the pressure control valve 300, refrigerant pressure (i.e., high-pressure side refrigerant pressure) at an outlet of the radiator 200 can be controlled.

Refrigerant decompressed in the pressure control valve 300 flows into an evaporator 400, and is evaporated in the evaporator 400 by absorbing heat from outside air outside the compartment. Refrigerant flowing from the evaporator 400 flows into an accumulator (i.e., gas-liquid separating unit) 500. In the accumulator 500, refrigerant from the evaporator 400 is separated into gas refrigerant and liquid refrigerant, so that gas refrigerant is introduced toward the compressor 100, and surplus refrigerant of the super-critical refrigerant cycle is stored therein.

A refrigerant temperature sensor 610 for detecting temperature of high-pressure side refrigerant is disposed at a refrigerant outlet side of the radiator 200, and a first refrigerant pressure sensor 620 for detecting pressure of high-pressure side refrigerant is disposed at the refrigerant outlet side of the radiator 200. A second refrigerant pressure sensor 630 for detecting pressure of low-pressure side refrigerant decompressed in the pressure control valve 300 is disposed at a refrigerant outlet side of the evaporator 400. An inlet air temperature sensor 640 for detecting temperature of air flowing into the radiator 200 is provided at an upstream air side of the radiator 200, and an outlet air temperature sensor 650 for detecting temperature of air having passed through the radiator 200 is disposed at a downstream air side of the radiator 200. Further, a temperature setting unit 660 for setting a temperature of inside air inside the compartment at a desired temperature of a person is disposed on an operation panel.

The set temperature set by the temperature setting unit 660 and detection values from the sensors 610–650 are input into an electronic control unit (hereinafter, referred to as "ECU") 700. The ECU 700 controls the opening degree of the pressure control valve 300 and the rotation speed (i.e., refrigerant amount discharged from the compressor 100) of the compressor 100, based on the set temperature of the temperature setting unit 660 and the detection values of the sensors 610–650 in accordance with a predetermined program.

Next, control operation of the super-critical refrigerant cycle according to the first embodiment will be now described with reference to the flow diagrams indicated in FIGS. 2–5.

Figure 2:
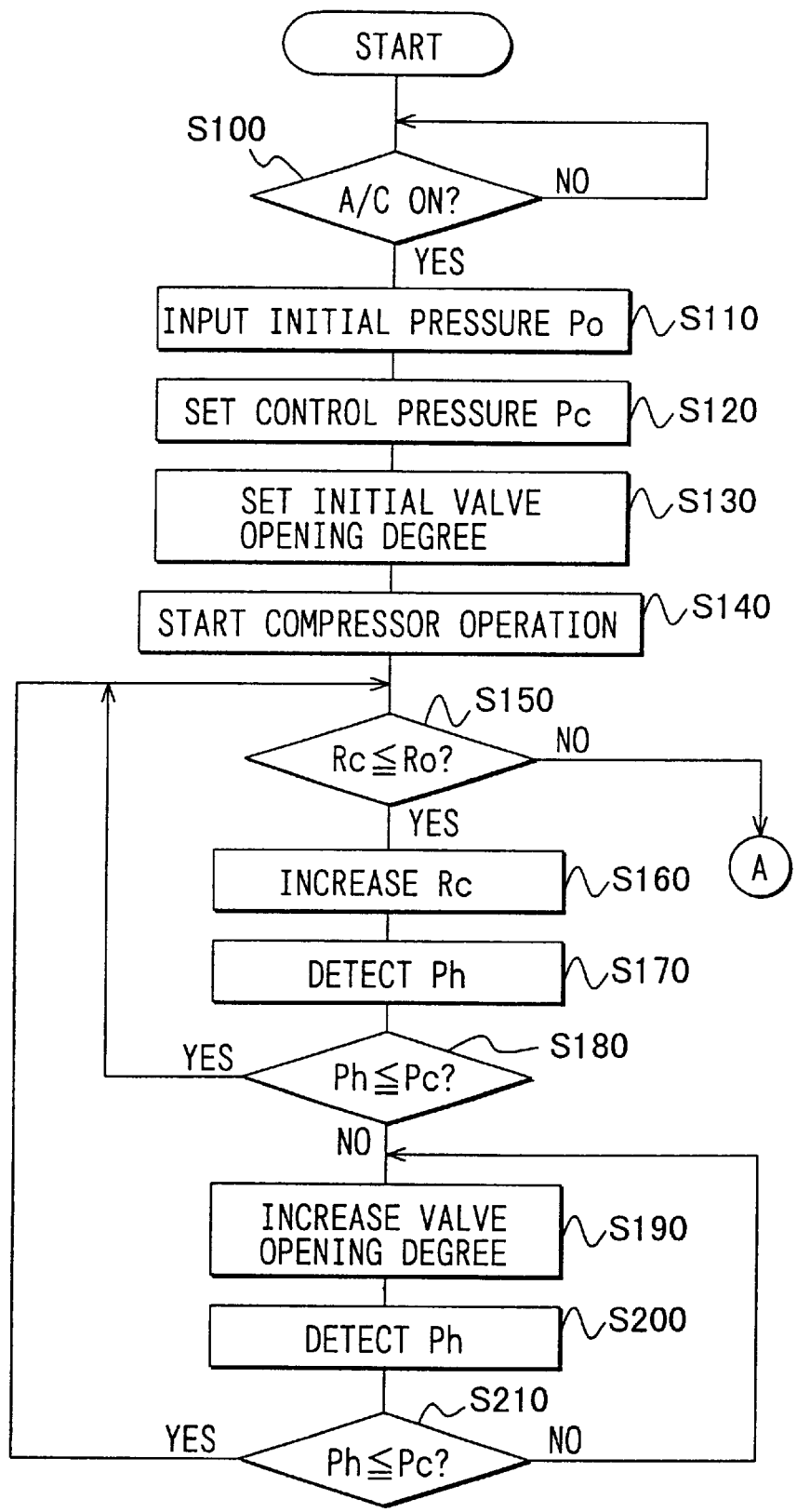
FIG. 2 is a flow diagram showing control operation of the super-critical refrigerant cycle according to the first embodiment.

As shown in FIG. 2, when an operation switch (A/C) of the super-critical refrigerant cycle (air conditioner) is turned on at step S100, an initial refrigerant pressure Po, detected by the first refrigerant pressure sensor 620 before the compressor 100 starts operation, is input at step S110. Next, a maximum refrigerant pressure (hereinafter, referred to as "control pressure Pc") at a starting time of the compressor 100 is determined based on the refrigerant pressure Po input at step S100, and the opening degree of the pressure control valve 300 is set at an initial opening degree at step S130. In the first embodiment, the control pressure Pc is larger than the initial refrigerant pressure Po before starting by approximately 2 MPa.

Next, during a period where the rotation speed of the compressor 100 is increased to a predetermined rotation speed from staring operation of the compressor 100, the opening degree of the pressure control valve 300 is adjusted so that the refrigerant pressure at the outlet side of the radiator 200 becomes equal to or lower than the control pressure Pc, and the rotation speed of the compressor 100 is increased to a predetermined rotation speed, at steps S140–S210. Specifically, after the operation of the compressor 100 is started at step S140, it is determined whether or not the rotation speed Rc of the compressor 100 is equal to or lower than a predetermined rotation speed Ro at step S150. When the rotation speed Rc of the compressor 100 is equal to or smaller than the predetermined rotation speed Ro and when the refrigerant pressure at the outlet side of the radiator 200 is equal to or lower than the control pressure Pc, the rotation speed Rc of the compressor 100 is increased while the opening degree of the pressure control valve 300 is set at the initial opening degree, at step S150–S180. That is, when it is determined that the rotation speed Rc of the compressor 100 is equal to or smaller than the predetermined speed Ro at step S150, the rotation speed Rc of the compressor 100 is increased at step S160, and the high-pressure side refrigerant pressure Ph is detected by the first pressure sensor 620. Next, at step S180, it is determined whether or not the high-pressure side refrigerant pressure Ph is equal to or lower than the control pressure PC.

When it is determined that the pressure Ph of high-pressure side refrigerant at the outlet side of the radiator 200 is higher than the control pressure PC at step S180 when the rotation speed of the compressor 100 is equal to or lower than the predetermined rotation speed Ro, the opening degree of the pressure control valve 300 is increased at step S190 so that the refrigerant pressure Ph at the outlet side of the radiator 200 detected by the first pressure sensor 620 at step S200 becomes equal to or smaller than the control pressure Pc. Further, it is determined whether or not the high-pressure side refrigerant pressure Ph is equal to or lower than the control pressure Pc at step S210, and the opening degree of the pressure control valve 300 is increased until the high-pressure side refrigerant pressure Ph is equal to or lower than the control pressure Pc. That is, in the first embodiment, the rotation speed of the compressor 100 is increased, while the opening degree of the pressure control valve 300 is increased so that the refrigerant pressure Ph at the outlet side of the radiator 200 becomes equal to or lower than the control pressure Pc. In the first embodiment, the control operation at step S100–S210 is a starting control, and control operation from step S220 is a general control.

Figure 3:
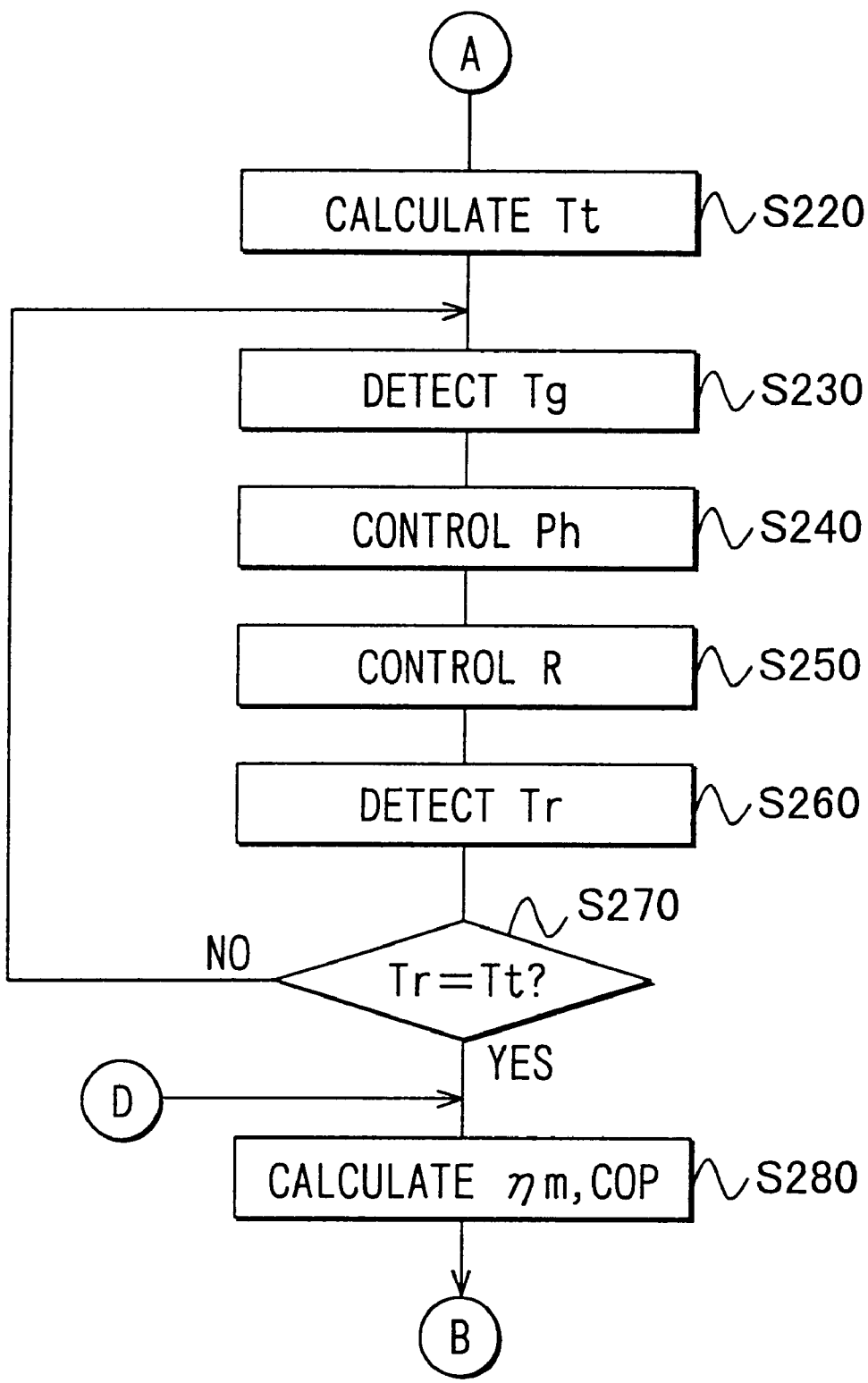
FIG. 3 is a flow diagram showing control operation of the super-critical refrigerant cycle according to the first embodiment.

When the rotation speed of the compressor 100 becomes larger than the predetermined rotation speed Ro at step S150, the general control is performed. As shown in FIG. 3, when the rotation speed of the compressor 100 is larger than the predetermined rotation speed Ro at step S150, a target temperature Tt of air blown from the radiator 200 into the compartment is calculated at step S220 based on a set temperature Ts set by the temperature setting unit 660 and an inlet air temperature Ti flowing into the radiator 200 detected by the inlet air temperature sensor 640.

Next, at step S230, the refrigerant temperature Tg at the outlet side of the radiator 200 detected by the refrigerant temperature sensor 610 is input. During steps S220–S270, the opening degree of the pressure control valve 300 and the rotation speed of the compressor 100 are controlled, so that the refrigerant temperature Tg and the refrigerant pressure Ph at the outlet side of the radiator 200 have the relationship indicated by the suitable control line $\eta_{max}$ in FIG. 6, and the air temperature Tr blown from the radiator 200 detected by the outlet air temperature sensor 650 becomes the target temperature Tt. That is, the refrigerant temperature Tg at the outlet of the radiator 200 is detected by the refrigerant temperature sensor 610 at step S230, the refrigerant pressure Ph at the high-pressure side is controlled at step S240, the rotation speed R of the compressor 100 is controlled at step S250, and the air temperature Tr blown from the radiator 200 is detected by the outlet air temperature sensor 650 at step S260. Until it is determined that the air temperature Tr blown from the radiator 200 is equal to the target temperature Tt at step S270, the control operation described at steps S230–S260 is performed.

In the first embodiment, the suitable control line $\eta_{max}$ shows the relationship, between the refrigerant temperature Tg at the outlet side of the radiator 200 and the refrigerant pressure Ph at the outlet side of the radiator 200, where the coefficient of performance of the refrigerant cycle becomes maximum.

Next, at step S280, the coefficient of performance of the super-critical refrigerant cycle is calculated based on the refrigerant temperature Tg at the outlet side of the radiator 200, the refrigerant pressure Ph detected by the first refrigerant pressure sensor 620 and a refrigerant pressure $P_{low}$ detected by the second refrigerant pressure sensor 630. Further, the efficiency $\eta_m$ of the compressor 100 is calculated based on the high-pressure side refrigerant pressure Ph, the low-pressure side refrigerant pressure $P_{low}$ and the rotation speed (rotation number N) of the compressor 100, at step S280.

Figure 7:
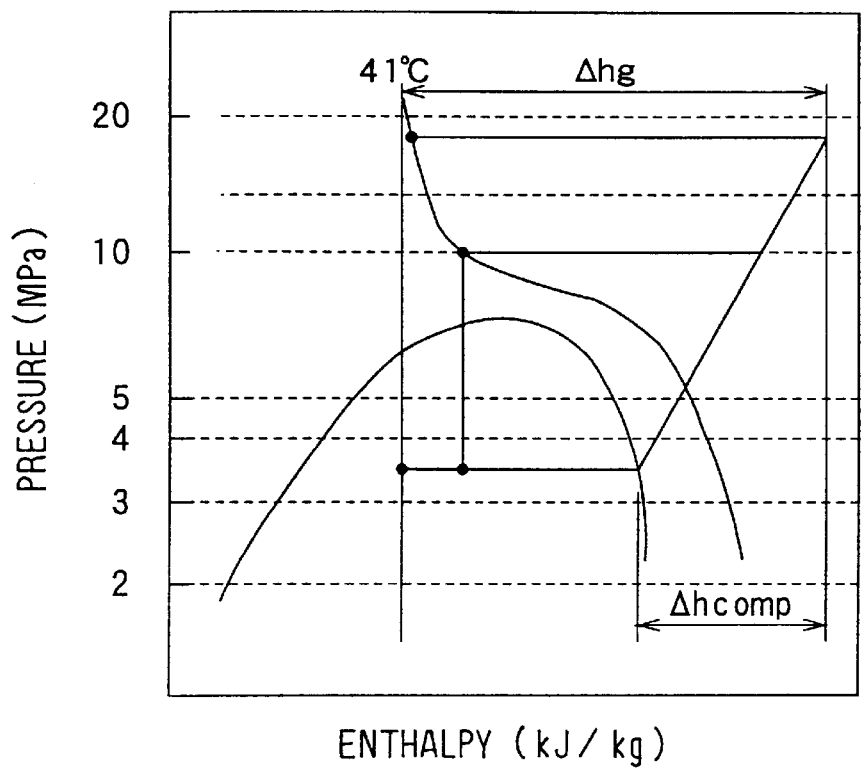
FIG. 7 is a Mollier diagram (p-h diagram) of carbon dioxide refrigerant.

A theoretical coefficient of performance (theoretical efficiency) of the super-critical refrigerant cycle during heating operation is indicated as a ratio ($\Delta h_g/\Delta h_{comp}$) of a heat quantity radiated in the radiator 200 to a theoretical compression amount per a refrigerant mass flow, as shown in FIG. 7. The effective efficiency (actual efficiency) $\eta$ of the refrigerant cycle is the product of the theoretical coefficient of performance and the efficiency $\eta m$ of compressor 100.

Figure 8:
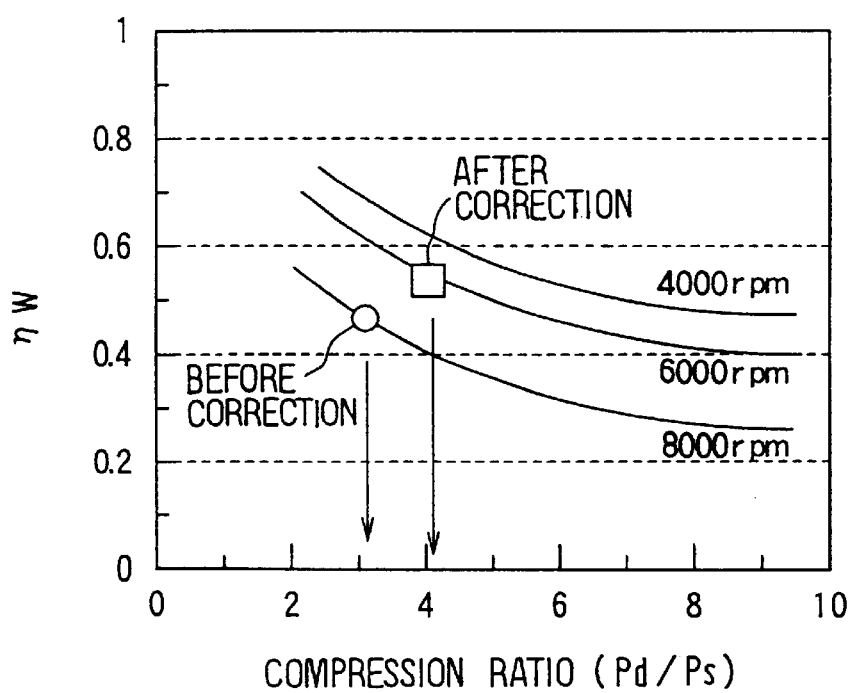
FIG. 8 is a graph showing a relationship between compression efficiency $\eta w$ and a compression ration (Pd/Ps) of a compressor.

On the other hand, the efficiency $\eta m$ of the compressor 100 is the product of efficiency of the electrical motor M and the compression efficiency $\eta w$ shown in FIG. 8. Each compressor 100 has a fixed efficiency $\eta m$. Further, the efficiency $\eta m$ of the compressor 100 is a ratio of a theoretical compression amount to a consumption power Wi.

Figure 4:
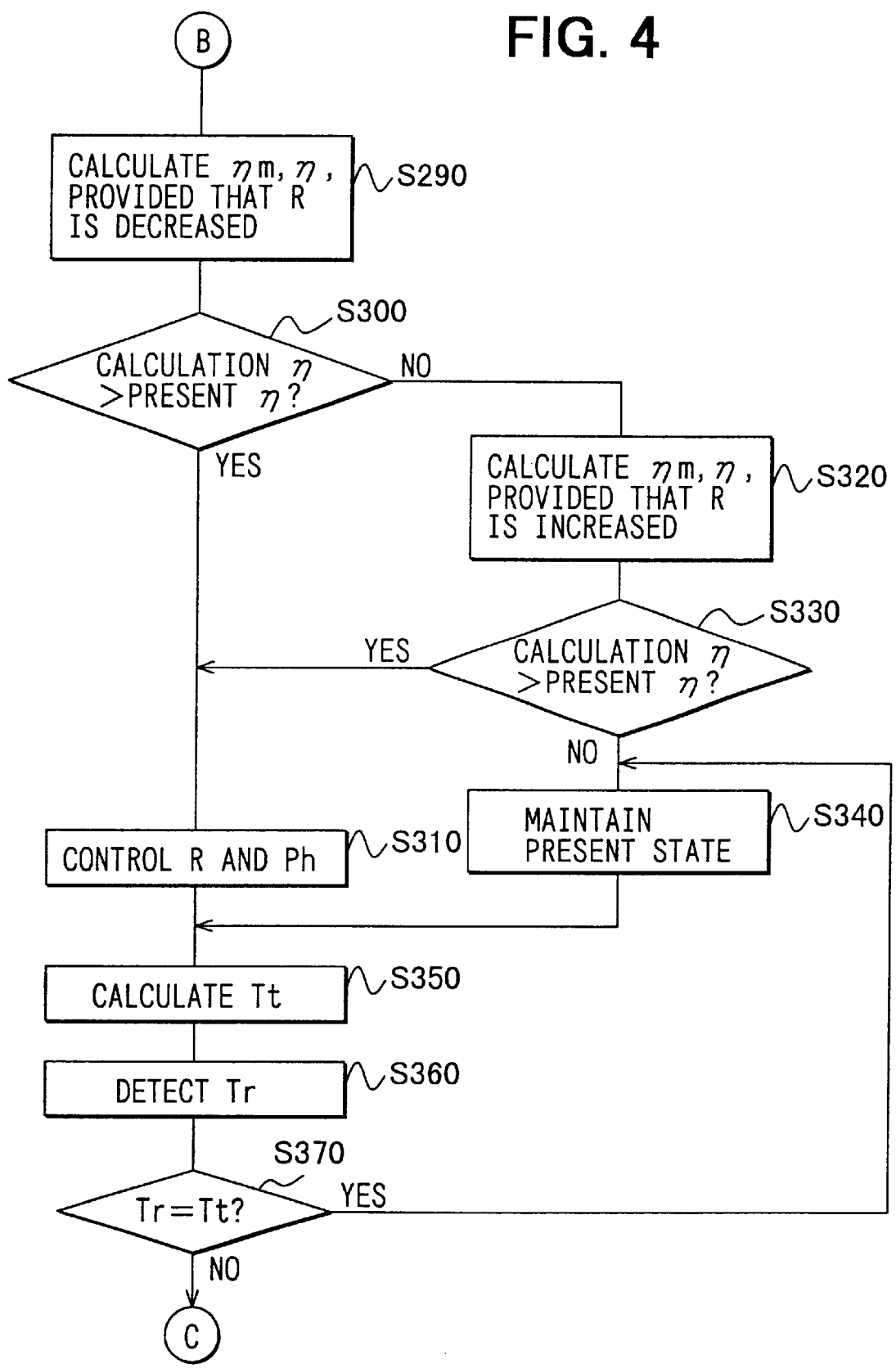
FIG. 4 is a flow diagram showing control operation of the super-critical refrigerant cycle according to the first embodiment.

Next, provided that the rotation speed R of the compressor 100 is decreased to a predetermined rotation speed so that refrigerant amount discharged from the compressor 100 is decreased, the refrigerant pressure at the outlet side of the radiator 200, necessary for maintaining the present heating capacity of the radiator 200, is calculated (simulated), and the efficiency $\eta m$ of the compressor 100 and the theoretical efficiency $\eta$ of the refrigerant cycle are calculated based on the calculation refrigerant pressure (simulation refrigerant pressure), at step S290 in FIG. 4. When a volume efficiency $\eta v$ of the compressor 100 is changed due to a variation in the rotation speed R of the compressor 100 or the high-pressure side refrigerant pressure Ph, the refrigerant amount discharged from the compressor 100 is changed. Accordingly, when the high-pressure side refrigerant pressure is calculated or when operation state of the super-critical refrigerant cycle is simulated, the volume efficient $\eta v$ is necessary to be considered. The volume efficiency $\eta v$ is a ratio (Md/Mi) of a refrigerant mass flow amount Md discharged from the compressor 100 to a theoretical suction mass flow amount Mi calculated by the rotation speed of the compressor 100 in a suction.

Next, at step S300, the efficiency $\eta$ of the refrigerant cycle calculated at step S290 and the present efficiency $\eta$ are compared. When the calculation efficiency $\eta$ calculated at step S290 is larger than the present efficiency $\eta$, the rotation speed of the compressor 100 is decreased by a predetermined value (e.g., 100 rpm), and the opening degree of the pressure control valve 300 is controlled so that the high-pressure side refrigerant pressure Ph becomes the refrigerant pressure calculated at step S290, at step S310.

On the other hand, when it is determined that the calculation efficiency $\eta$ calculated at step S290 is equal to or lower than the present efficiency $\eta$ at step S300, provided that the rotation speed of the compressor 100 is increased by a predetermined rotation speed (e.g., 100 rpm) so that refrigerant amount discharged from the compressor 100 is increased, the refrigerant pressure at the outlet side of the radiator 200, necessary for maintaining the present heating capacity of the radiator 200, is calculated (simulated), and the efficiency $\eta m$ of the compressor 100 and the theoretical efficiency $\eta$ of the refrigerant cycle are calculated based on the calculation refrigerant pressure (simulation refrigerant pressure), at step S320.

Next, at step S330, the calculation efficiency $\eta$ of the refrigerant cycle calculated at step S320 and the present efficiency η of the refrigerant cycle are compared. When the calculation efficiency η calculated at step S320 is larger than the present efficiency η, the rotation speed of the compressor 100 is increased by a predetermined value, and the opening degree of the pressure control valve 300 is controlled so that the high-pressure side refrigerant pressure Ph becomes the refrigerant pressure calculated at step S320, at step S310.

On the other hand, when it is determined that the calculation efficiency η calculated at step S330 is equal to or lower than the present efficiency η at step S330, the opening degree of the pressure control valve 300 and the rotation speed of the compressor 100 are maintained at the present state at step S340. That is, at step 340, the state of step S280 is maintained.

Next, the target temperature Tt of air blown from the radiator 200 to the compartment is calculated at step S350, and air temperature Tr blown from the radiator 200 is detected by the outlet air temperature sensor 650 at step S360. Further, at step S370, the air temperature Tr from the radiator 200 is compared with the target temperature Tt at step S370. When the air temperature Tr from the radiator 200 is equal to the target temperature Tt at step S370, the present opening degree of the pressure control valve 300 and the present rotation speed of the compressor 100 are maintained at step S340.

Figure 5:
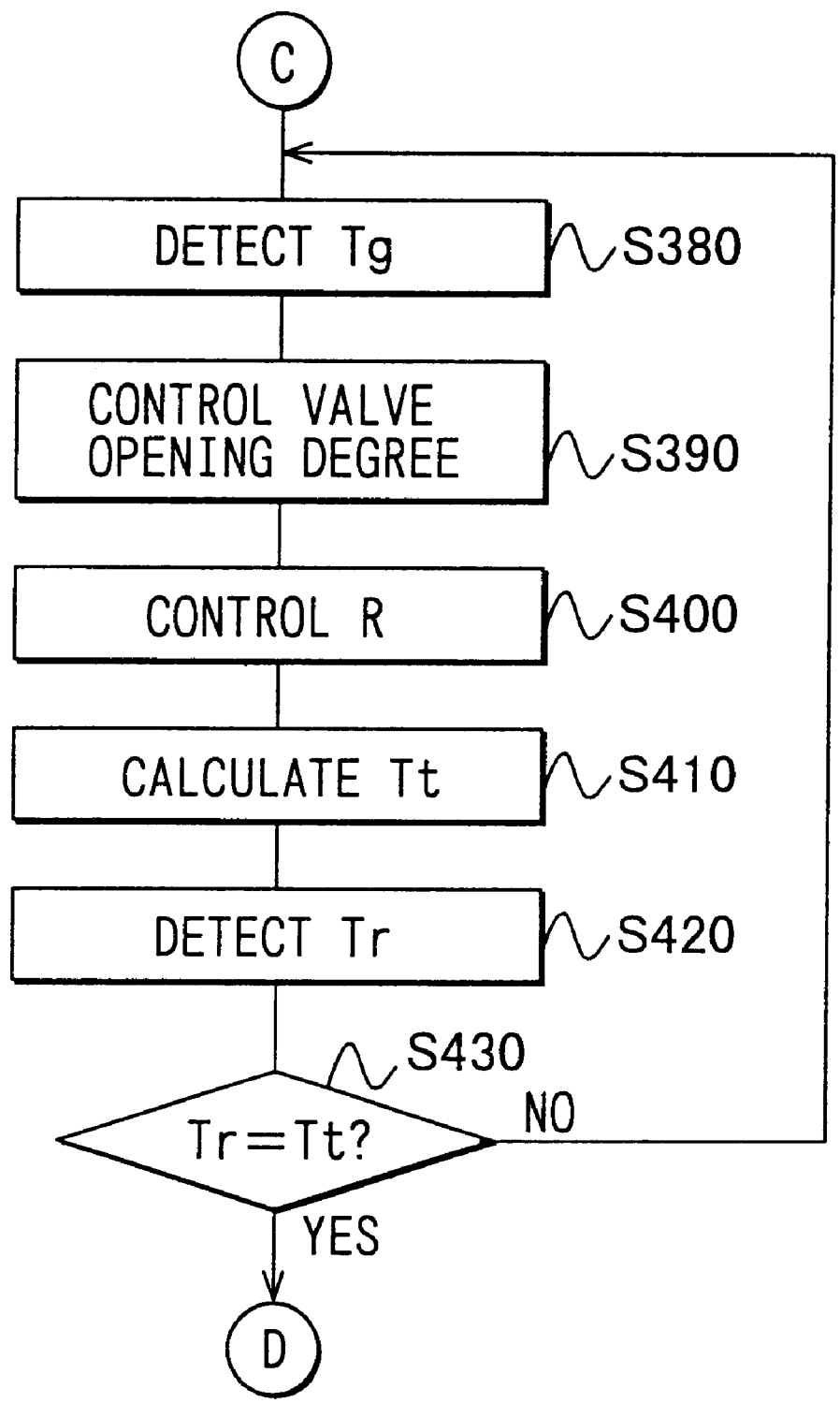
FIG. 5 is a flow diagram showing control operation of the super-critical refrigerant cycle according to the first embodiment.
Figure 6:
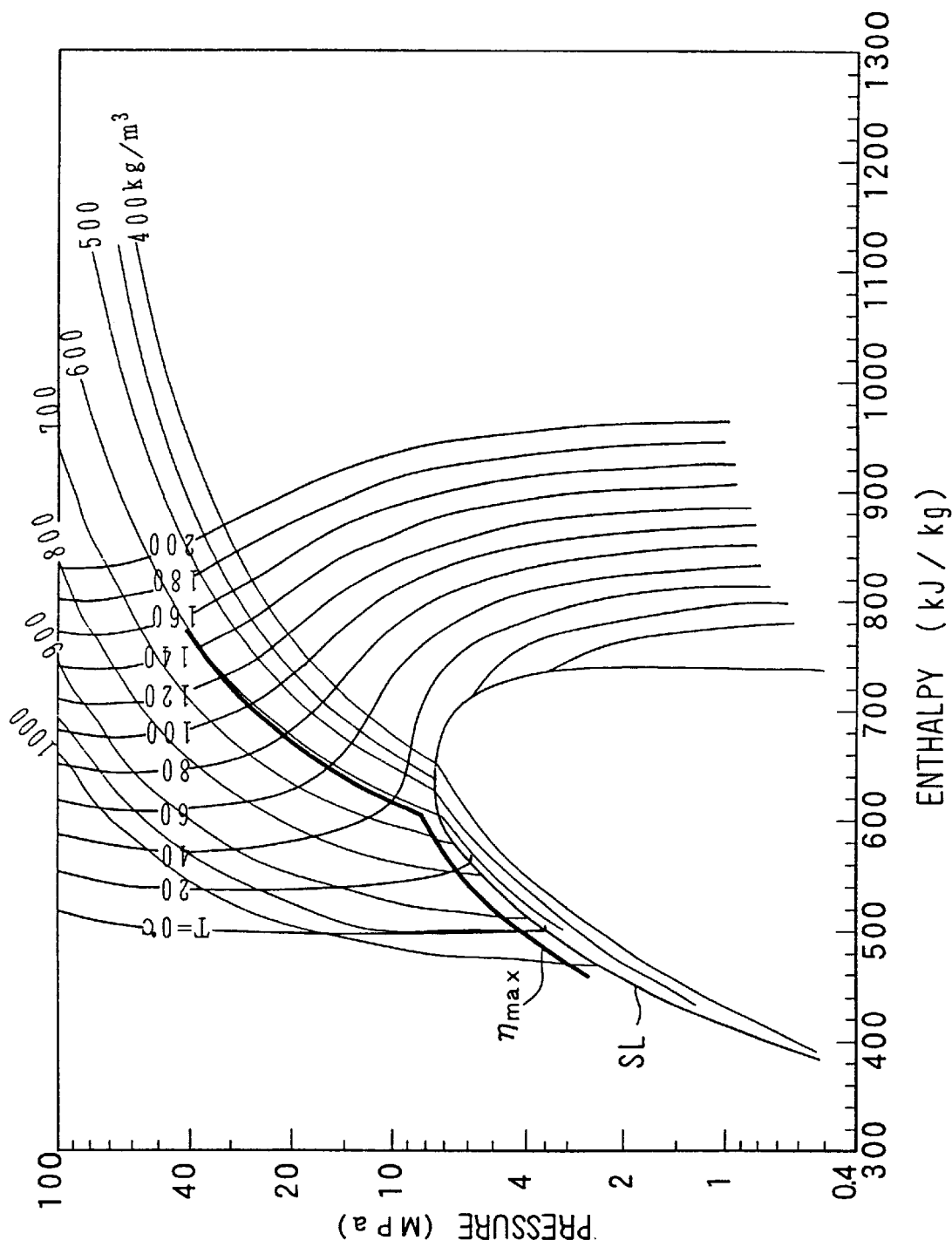
FIG. 6 is a Mollier diagram (p-h diagram) of carbon dioxide refrigerant.

On the other hand, when the air temperature Tr blown from the radiator 200 into the compartment is different from the target temperature Tt, the refrigerant temperature Tg at the outlet side of the radiator 200 is detected at step S380 in FIG. 5. Further, the opening degree of the pressure control valve 300 is controlled at step S390, the rotation speed of the compressor 100 is controlled at step 400, the target temperature Tt of air blown from the radiator 200 is calculated at step S410, and the air temperature Tr from the radiator 200 into the compartment is detected at step S420. Thereafter, the air temperature Tr heated by the radiator 200 is compared with the target temperature Tt at step S430, and the operation control of steps S380–S390 are repeated until the air temperature Tr blown from the radiator 200 becomes equal to the target temperature Tt. That is, the opening degree of the pressure control valve 300 and the rotation speed of the compressor 100 are controlled, so that the refrigerant temperature Tg and the refrigerant pressure Ph at the outlet side of the radiator 200 have the suitable control line 72, and the air temperature Tr detected by the outlet air temperature sensor 650 becomes the target temperature Tt. After it is determined that the air temperature Tr detected by the outlet air temperature sensor 650 is equal to the target temperature Tt at step S430, the control operation of steps S280–S430 is repeated.

According to the first embodiment of the present invention, because the refrigerant amount discharged from the compressor 100 and the opening degree of the pressure control valve 300 are controlled, both the theoretical efficiency of the refrigerant cycle and the efficiency ηm of the compressor 100 can be increased. Accordingly, the effective efficiency η of the refrigerant cycle can be increased, while necessary capacity of the refrigerant cycle is obtained.

Figure 9:
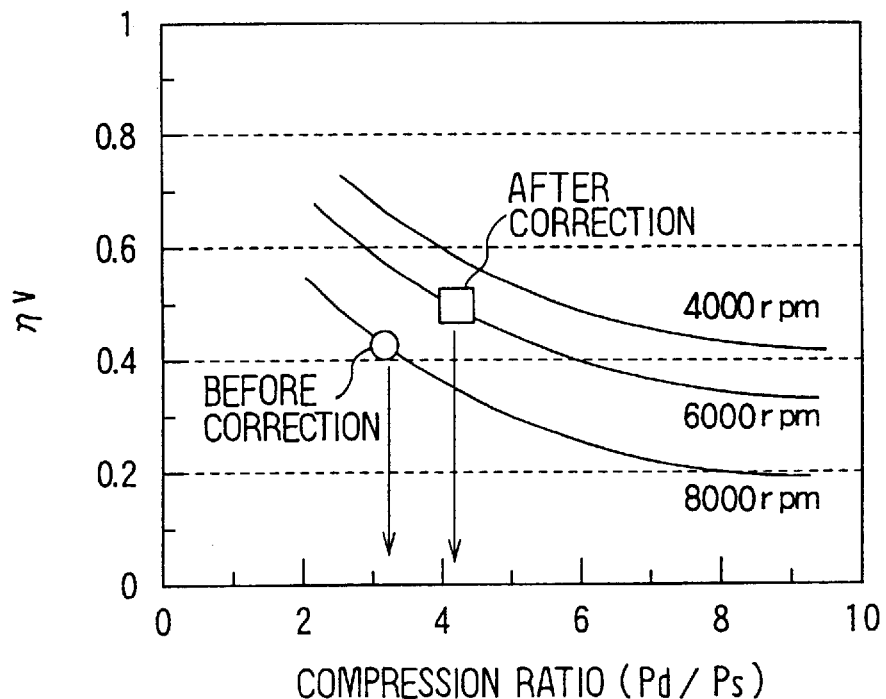
FIG. 9 is a graph showing a relationship between volume efficiency $\eta v$ and the compression ratio (Pd/Ps) of the compressor.

For example, as shown in FIGS. 8 and 9, when the rotation speed of the compressor 100 is decreased from 8000 rpm to 6000 rpm while the present heating capacity is maintained, the compression ratio (Pd/Ps) of the compressor 100 is increased. However, in this case, because the compression efficiency ηw and the volume efficiency ηv of the compressor 100 are increased, it is possible to increase the efficiency ηm of the compressor 100.

Figure 10:
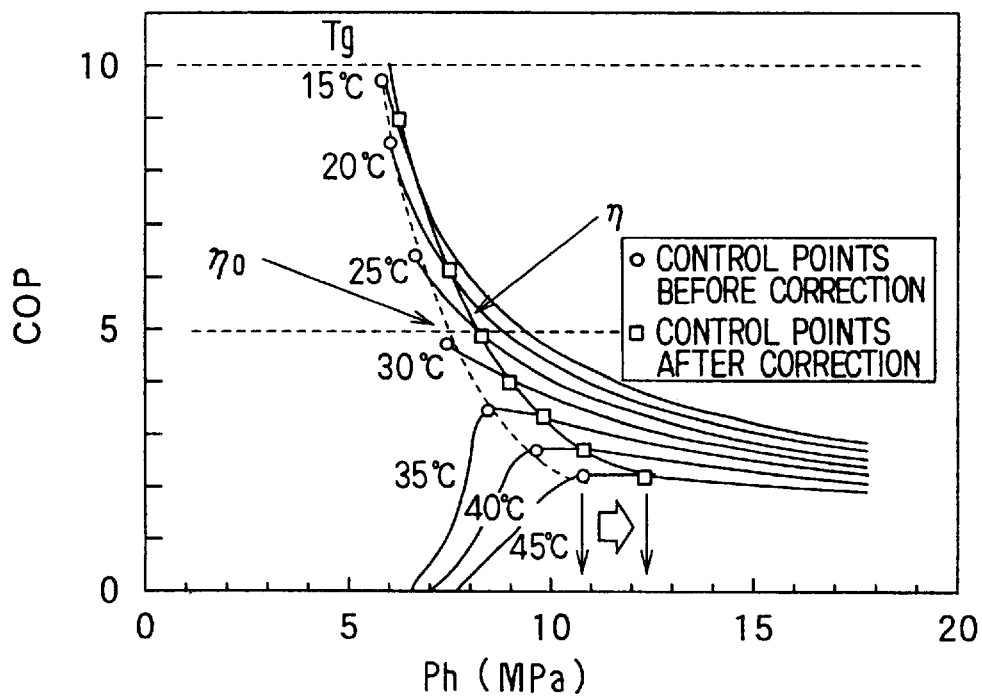
FIG. 10 is a graph showing a relationship between a high-pressure side refrigerant pressure Ph and effective efficiency $\eta$ (COP) of the refrigerant cycle.
Figure 11:
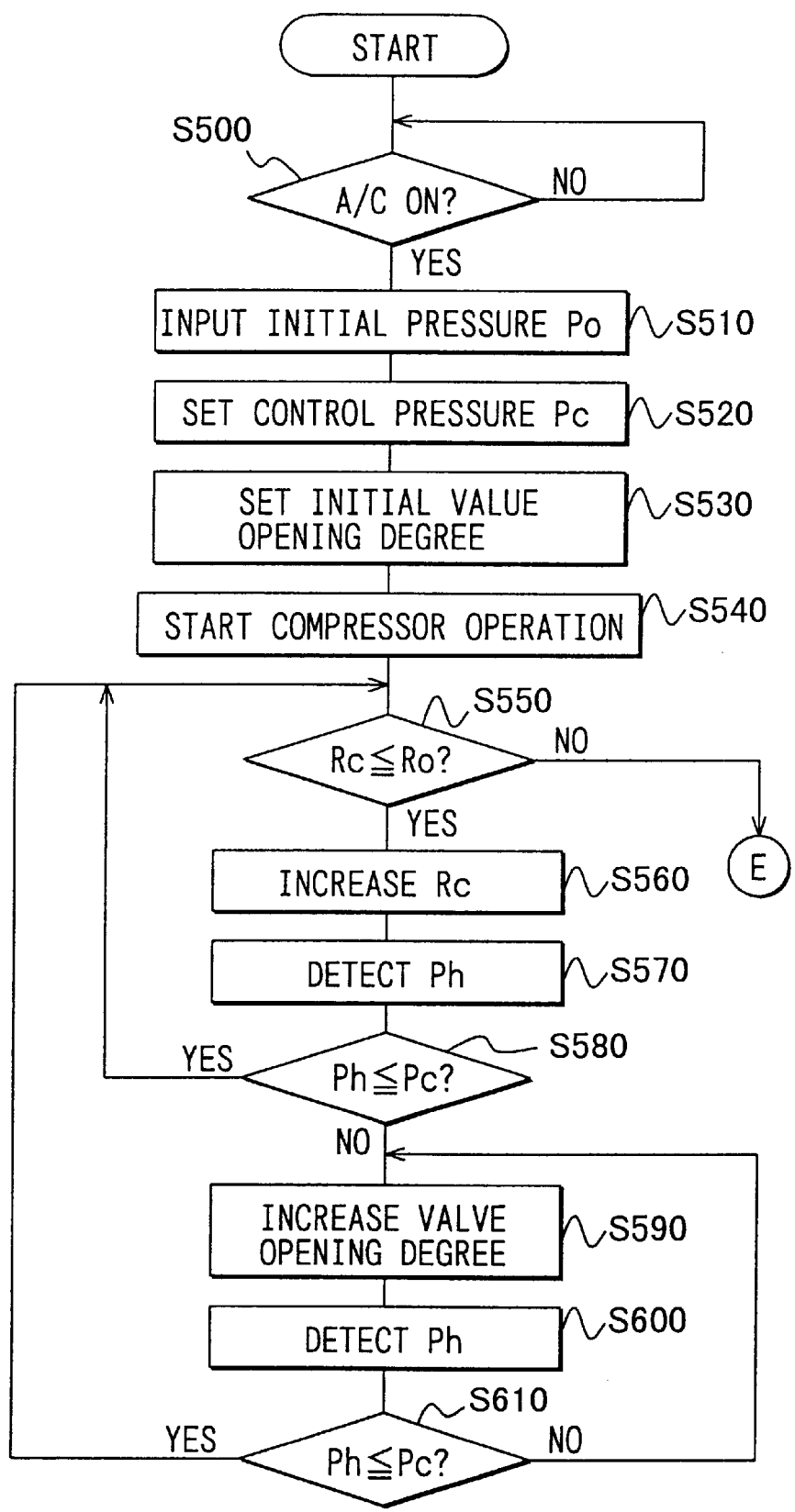
FIG. 11 is a flow diagram showing control operation of a super-critical refrigerant cycle according to a second preferred embodiment of the present invention.

In FIG. 10, the chain line graph connecting maximum COP control points is the maximum control line ηo where only the high-pressure side refrigerant pressure Ph is increased for increasing capacity of a refrigerant cycle system, and the solid line graph connecting the suitable control points after correction is the suitable control line η where both the high-pressure side refrigerant pressure Ph and the refrigerant amount discharged from the compressor 100 are controlled. As shown in FIG. 10, in the first embodiment of the present invention, the effective efficiency (COP) of the refrigerant cycle is improved. That is, at the same high-pressure side refrigerant pressure Ph, the effective efficiency of the refrigerant cycle is increased.

A second preferred embodiment of the present invention will be now described with reference to FIGS. 11–14. In the above-described first embodiment, the effective efficiency (actual efficiency) η of the refrigerant cycle is calculated based on the theoretical efficiency of the refrigerant cycle and the efficiency ηm of compressor 100. However, in the second embodiment, after the effective efficiency η of the refrigerant cycle is measured, the refrigerant amount discharged from the compressor 100 and the opening degree of the pressure control valve 300 are controlled based on the measured effective efficiency η.

The control operation of the refrigerant cycle according to the second embodiment will be now described with reference to FIGS. 11–14. As shown in FIG. 2, when an operation switch (A/C) of the super-critical refrigerant cycle (air conditioner) is turned on at step S500, the initial refrigerant pressure Po, detected by the first refrigerant pressure sensor 620 before the compressor 100 starts operation, is input at step S510. Next, the control pressure Pc at a starting time of the compressor 100 is determined based on the initial refrigerant pressure Po input at step S510, and the opening degree of the pressure control valve 300 is set at an initial opening degree at step S530. In the second embodiment, the control pressure Pc is larger than the initial refrigerant pressure Po before starting of the compressor 100 by approximately 2 MPa.

Next, during a period where the rotation speed of the compressor 100 is increased to a predetermined rotation speed from staring operation of the compressor 100, the opening degree of the pressure control valve 300 is adjusted so that the refrigerant pressure at the outlet side of the radiator 200 becomes equal to or lower than the control pressure Pc, and the rotation speed of the compressor 100 is increased to a predetermined rotation speed, at steps S540–S610. Specifically, after the operation of the compressor 100 is started at step S540, it is determined whether or not the rotation speed Rc of the compressor 100 is equal to or lower than a predetermined rotation speed Ro at step S550. When the rotation speed Rc of the compressor 100 is equal to or smaller than the predetermined rotation speed Ro and when the refrigerant pressure at the outlet side of the radiator 200 is equal to or lower than the control pressure Pc, the rotation speed Rc of the compressor 100 is increased while the opening degree of the pressure control valve 300 is set at the initial opening degree, at step S550–S580. That is, when it is determined that the rotation speed Rc of the compressor 100 is equal to or smaller than the predetermined speed Ro at step S550, the rotation speed Rc of the compressor 100 is increased at step S560, and the high-pressure side refrigerant pressure Ph is detected by the first pressure sensor 620 at step S570. Next, at step S580, it is determined whether or not the high-pressure side refrigerant pressure Ph is equal to or lower than the control pressure Pc.

When it is determined that the pressure Ph of high-pressure side refrigerant at the outlet side of the radiator 200 is higher than the control pressure Pc at step S580 when the rotation speed of the compressor 100 is equal to or lower than the predetermined rotation speed Ro, the opening degree of the pressure control valve 300 is increased at step S590 so that the refrigerant pressure Ph at the outlet side of the radiator 200 detected by the first pressure sensor 620 at step S600 becomes equal to or smaller than the control pressure Pc. Further, it is determined whether or not the high-pressure side refrigerant pressure Ph is equal to or lower than the control pressure Pc at step S610, and the opening degree of the pressure control valve 300 is increased until the high-pressure side refrigerant pressure Ph is equal to or lower than the control pressure Pc. That is, in the second embodiment, in a case where the rotation speed of the compressor 100 is equal to or lower than the predetermined speed Ro, when the high-pressure side refrigerant pressure Ph at the outlet side of the radiator 200 is larger than the control pressure Pc, the rotation speed of the compressor 100 is increased, while the opening degree of the pressure control valve 300 is increased so that the refrigerant pressure Ph at the outlet side of the radiator 200 becomes equal to or lower than the control pressure Pc.

When the rotation speed of the compressor 100 is larger than the predetermined rotation speed Ro at step S550, a target temperature Tt of air blown from the radiator 200 into the compartment is calculated at step S620 based on a set temperature Ts set by the temperature setting unit 660 and an inlet air temperature Ti flowing into the radiator 200 detected by the inlet air temperature sensor 640.

Next, at step S630, the refrigerant temperature Tg at the outlet side of the radiator 200 detected by the refrigerant temperature sensor 610 is input. During steps S620–S670, the opening degree of the pressure control valve 300 and the rotation speed R of the compressor 100 are controlled, so that the refrigerant temperature Tg and the refrigerant pressure Ph at the outlet side of the radiator 200 have the relationship indicated by the suitable control line $\eta_{max}$ in FIG. 6, and the air temperature Tr blown from the radiator 200 detected by the outlet air temperature sensor 650 becomes the target temperature Tt. That is, the refrigerant temperature Tg at the outlet of the radiator 200 is detected by the refrigerant temperature sensor 610 at step S630, the refrigerant pressure Ph at the high-pressure side is controlled at step S640, the rotation speed R of the compressor 100 is controlled at step S650, and the air temperature Tr blown from the radiator 200 is detected by the outlet air temperature sensor 650 at step S660. Until it is determined that the air temperature Tr blown from the radiator 200 is equal to the target temperature Tt at step S670, the control operation described at steps S630–S660 is performed.

Next, at step S680, heat quantity radiated from the radiator 200 to air is calculated based on a temperature difference between the air temperature flowing into the radiator 200 and the air temperature blown from the radiator 200, and an air amount passing through the radiator 200 and the like. Further, consumption power (consumed electrical power) actually consumed in the compressor 100 is detected, and the coefficient of performance (effective efficiency $\eta$) of the super-critical refrigerant cycle is calculated at step S680. The effective efficiency $\eta$ of the super-critical refrigerant cycle, calculated at step S680 in the second embodiment, includes all loss generated by operation of the super-critical refrigerant cycle such as refrigerant pressure loss in the radiator 200 and the evaporator 400, Joule loss and heat loss in the compressor 100. The effective efficiency $\eta$ of the super-critical refrigerant cycle in the second embodiment is similar to that in the above-described first embodiment.

In the second embodiment, the heat quantity is calculated by the temperature difference of air flowing into the radiator 200 and air flowing out from the radiator 200, and the air amount passing through the radiator 200, and the like. That is, the heat quantity radiated from the radiator 200 to air includes a moving heat quantity moved from the low-temperature side (e.g., the side of the evaporator 400) to the high-temperature side (e.g., the side of the radiator 200), and a compression heat quantity from the compressor 100 to refrigerant.

Figure 13:
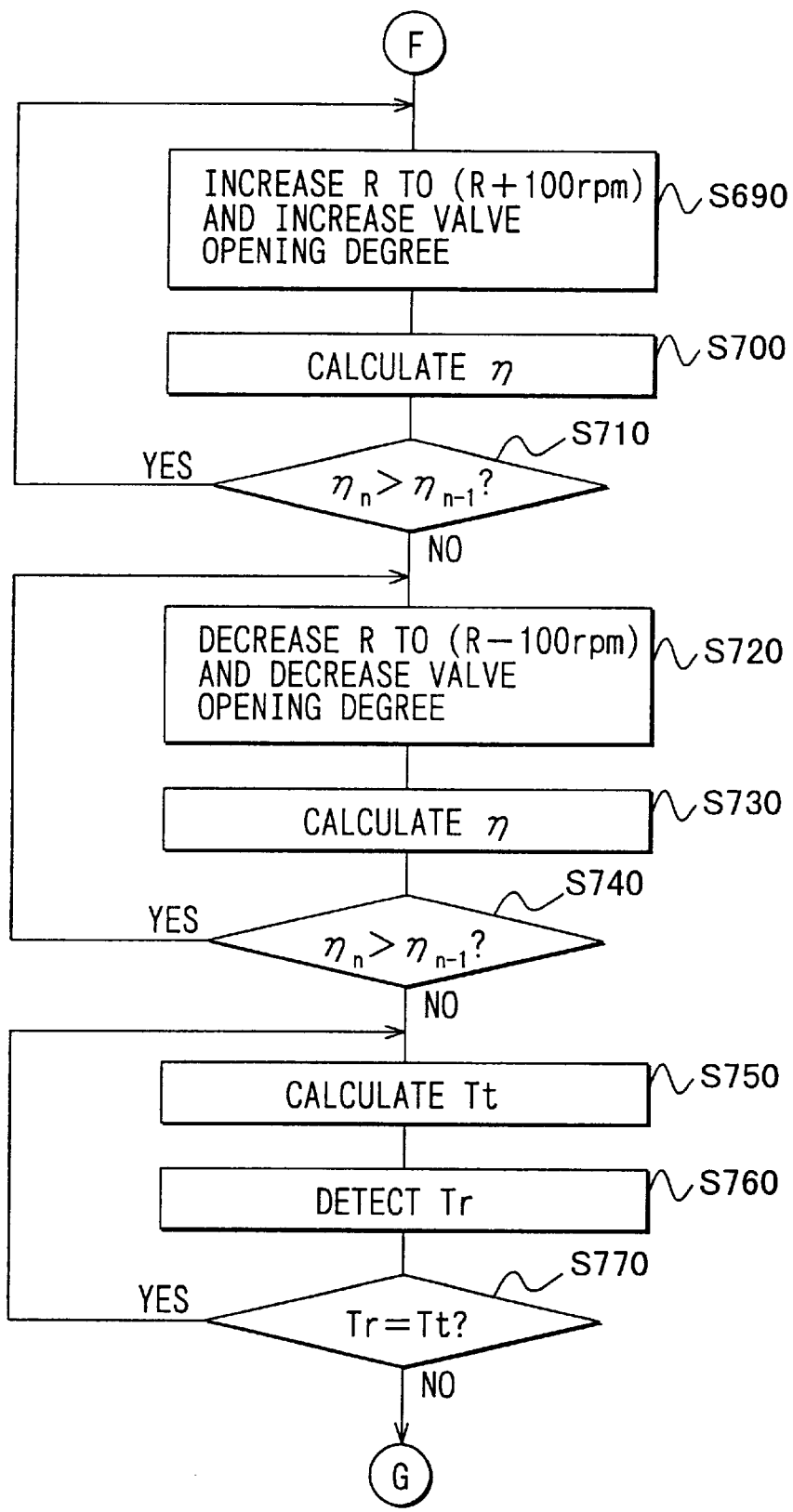
FIG. 13 is a flow diagram showing control operation of the super-critical refrigerant cycle according to the second embodiment.

Next, as shown in FIG. 13, at step S690, after the rotation speed R of the compressor 100 is increased by a predetermined rotation speed (e.g., 100 rpm), and the opening degree of the pressure control valve 300 is increased so that the present heating capacity of step S680 is maintained. Thereafter, at step S700, the present effective efficiency $\eta$ of the refrigerant cycle is calculated by the same way as step S680. At step S700, the present effective efficiency $\eta$ is indicated as "$\eta_n$", and the preceding effective efficiency $\eta$ calculated at step S680 is indicated as "$\eta_{n-1}$". Next, at step S710, the preceding effective efficiency $\eta_{n-1}$ calculated at step S680 and the present effective efficiency $\eta_n$ calculated at step S710 are compared, so that it is determined whether or not the present effective efficiency $\eta_n$ calculated at step S710 is larger than the preceding effective efficiency $\eta_{n-1}$ calculated at step S680. When the present effective efficiency $\eta_{n-1}$, is larger than the preceding effective efficiency $\eta_{n-1}$, the rotation speed of the compressor 100 is increased again, and thereafter, the opening degree of the pressure control valve 300 is increased so that the present heating capacity of step S680 is maintained, at step S690. Thereafter, the present effective efficiency $\eta_n$ is calculated again at step S700, and the preceding effective efficiency $\eta_{n-1}$ calculated at the preceding time at step S700 and the present effective efficiency $\eta_n$ calculated at the present time at step S700 are compared at step S710. That is, until the present effective efficiency $\eta_n$ calculated at the present time becomes equal to or lower than the preceding effective efficiency $\eta_{n-1}$ calculated at the preceding time before one time from the present time, the control operation of steps S690–S710 is repeated.

When it is determined that the present effective efficiency $\eta_n$ calculated at the present time is equal to or lower than the preceding effective efficiency $\eta_{n-1}$ calculated at the preceding time before one time from the present time at step S710, the rotation speed of the compressor 100 is decreased by a predetermined rotation speed (e.g., 100 rpm), and thereafter, the opening degree of the pressure control valve 300 is also decreased at step S720 so that the present heating capacity calculated at step S680 is maintained. Thereafter, at step S730, the present effective efficiency $\eta_n$ is calculated by the same way as that of step S680. Next, at step S740, the preceding effective efficiency $\eta_{n-1}$ calculated at step S700 and the present effective efficiency $\eta$n calculated at step S730 are compared, so that it is determined whether or not the present effective efficiency $\eta_n$ calculated at step S730 is larger than the preceding effective efficiency $\eta_{n-1}$ calculated at step S710. When the present effective efficiency $\eta$ is larger than the preceding effective efficiency $\eta_{n-1}$, the rotation speed R of the compressor 100 is decreased again, and thereafter, the opening degree of the pressure control valve 300 is decreased so that the present heating capacity of step S680 is maintained, at step S720. Thereafter, the present effective efficiency $\eta_n$ is calculated again at step S730, and the preceding effective efficiency $\eta_{n-1}$ calculated at the preceding time at step S730 and the present effective efficiency $\eta_n$ calculated at the present time at step S730 are compared at step S740. That is, until the present effective efficiency $\eta_n$ calculated at the present time becomes equal to or lower than the preceding effective efficiency $\eta_{n-1}$ calculated at the preceding time before one time from the present time, the operation control of steps S720–S740 is repeated.

Figure 14:
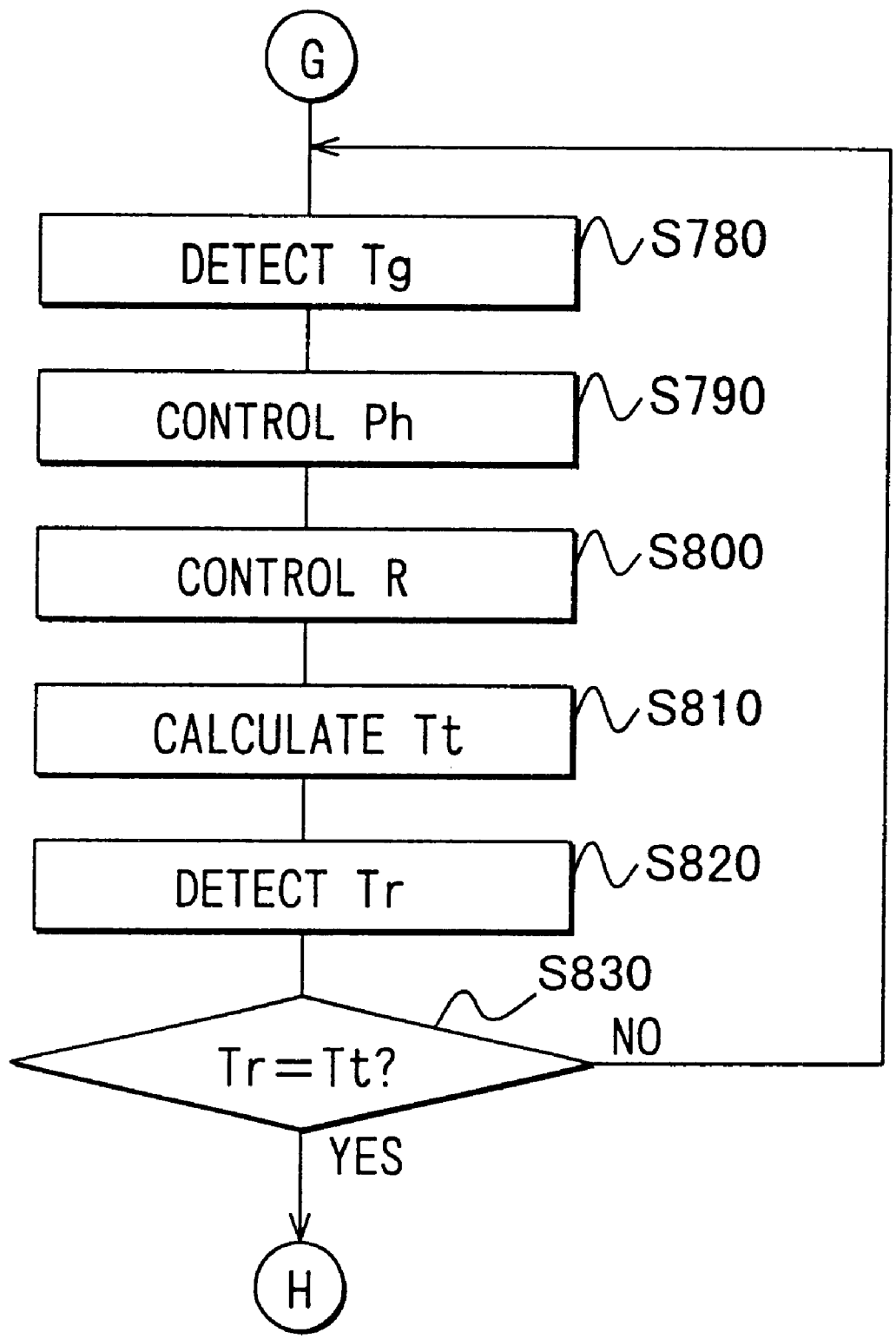
FIG. 14 is a flow diagram showing control operation of the super-critical refrigerant cycle according to the second embodiment.

When it is determined that the present effective efficiency $\eta_n$ calculated at the present time is equal to or lower than the preceding effective efficiency $\eta_{n-1}$ calculated at the preceding time before one time from the present time at step S740, a target temperature Tt of air blown from the radiator 200 is calculated at step S750, and the air temperature Tr blown out from the radiator 200 is detected at step S760. Next, at step S770, the detected air temperature Tr blown from the radiator 200 is compared with the target temperature Tt of air blown from the radiator 200. When the air temperature Tr is equal to the target temperature Tt, the opening degree of the pressure control valve 300 and the rotation speed R of the compressor 100 are maintained at the present states (i.e., the states at the last time at step S720). When the air temperature Tr blown into the compartment from the radiator 200 is different from the target temperature Tt, the control operation of steps S780–S830 in FIG. 14 is performed. That is, when the air temperature Tr blown into the compartment from the radiator 200 is different from the target temperature Tt at step S770, the refrigerant temperature Tg at the outlet side of the radiator 200 is detected by the refrigerant temperature sensor 610 at step S780, the refrigerant pressure Ph at the high-pressure side is controlled at step S790, and the rotation speed R of the compressor 100 is controlled at step S800, the target temperature Tt of air blown from the radiator 200 is calculated at step S810, and the air temperature Tr blown from the radiator 200 is detected by the outlet air temperature sensor 650 at step S820. Here, the opening degree of the pressure control valve 300 and the rotation speed R of the compressor 100 are controlled, so that the refrigerant temperature Tg and the refrigerant pressure Ph at the outlet side of the radiator 200 are positioned on the suitable control line $\eta$, and the detected air temperature Tr blown into the compartment from the radiator 200 becomes the target temperature Tt. Until it is determined that the air temperature Tr blown from the radiator 200 is equal to the target temperature Tt at step S830, the control operation described of steps S789–S830 is performed. After it is determined that the air temperature Tr blown from the radiator 200 is equal to the target temperature Tt at step S830, the control program moves to step S680, and the operation control of steps S680–30 is repeated.

According to the second embodiment of the present invention, the effective efficiency $\eta$ (i.e., effective coefficient of performance) of the refrigerant cycle is calculated based on a moving heat quantity moved from the evaporator 400 to the radiator 200 and a consumed power consumed by the compressor 100, and then the refrigerant amount (i.e., rotation speed R) discharged from the compressor 100 and the opening degree of the pressure control valve 300 are controlled based on the effective efficiency $\eta$. Accordingly, the effective efficiency $\eta$ is increased while necessary capacity of components of the refrigerant cycle is obtained.

A third preferred embodiment of the present invention will be now described with reference to FIG. 15. In the above-described second embodiment of the present invention, after the rotation speed R (discharge refrigerant amount) of the compressor 100 is changed, the opening degree of the pressure control valve 300 is controlled. However, in the third embodiment, after the opening degree of the pressure control valve 300 is changed, the refrigerant amount discharged from the compressor 100 is controlled.

Figure 15:
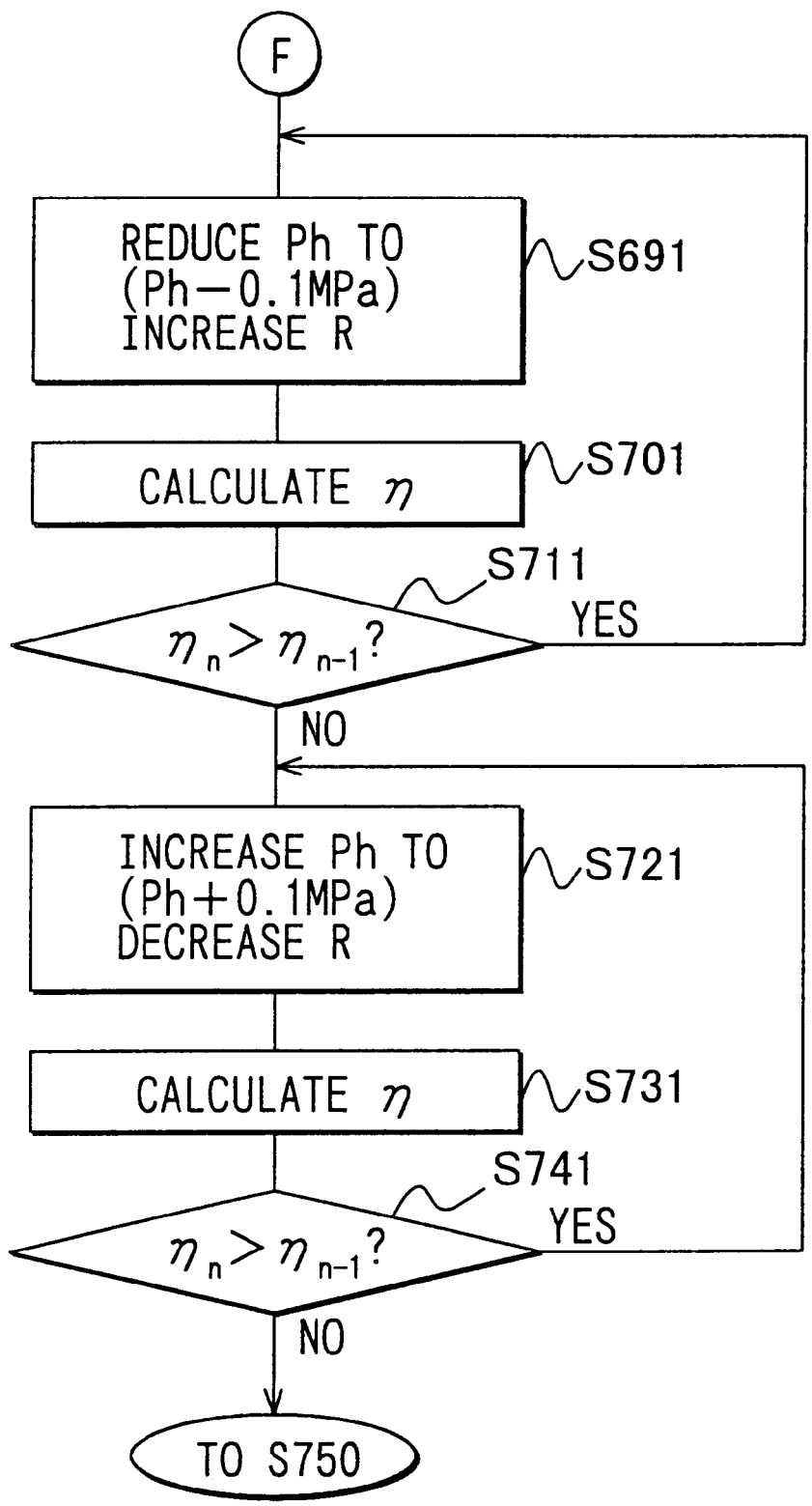
FIG. 15 is a flow diagram showing control operation of a super-critical refrigerant cycle according to a third preferred embodiment of the present invention.

That is, the control operation of steps S690–S740 in FIG. 13 is changed as shown in FIG. 15. In the third embodiment, the other parts are similar to those in the above-described second embodiment.

As shown in FIG. 15, at step S691, after the opening degree of the pressure control valve 300 is made larger so that the refrigerant pressure Ph at the high-pressure side is decreased by a predetermined pressure (e.g., 0.1 MPa), and the rotation speed R of the compressor 100 is increased so that the present heating capacity of step S680 is maintained. Next, at step S701, the effective efficiency $\eta$ of the refrigerant cycle is calculated by the same way as step S680. Next, at step S711, the preceding effective efficiency $\eta_{n-1}$ calculated at step S680 and the present effective efficiency $\eta_n$ calculated at step S711 are compared, so that it is determined whether or not the present effective efficiency $\eta_n$ calculated at step S711 is larger than the preceding effective efficiency $\eta_{n-1}$ calculated at step S680. When the present effective efficiency $\eta_n$ is larger than the preceding effective efficiency $\eta_{n-1}$, the opening degree of the pressure control valve 300 is increased so that the refrigerant pressure Ph at the high-pressure side is further reduced by a predetermined pressure (e.g., 0.1 MPa), and thereafter, the rotation speed R of the compressor 100 is increased again so that the present heating capacity of step S680 is maintained, at step S691. Thereafter, the present effective efficiency $\eta_n$ is calculated again at step S701, and the preceding effective efficiency $\eta_{n-1}$ calculated at the preceding time at step S701 and the present effective efficiency $\eta_n$ calculated at the present time at step S701 are compared at step S711. That is, until the present effective efficiency $\eta_n$ calculated at the present time becomes equal to or lower than the preceding effective efficiency $\eta_{n-1}$ calculated at the preceding time before one time from the present time, the operation control of steps S691–S711 is repeated.

When it is determined that the present effective efficiency $\eta_n$ calculated at the present time is equal to or lower than the preceding effective efficiency $\eta_{n-1}$ calculated at the preceding time before one time from the present time at step S711, the opening degree of the pressure control valve 300 is made smaller so that the refrigerant pressure Ph at the high-pressure side is increased by a predetermined pressure (e.g., 0.1 MPa), and the rotation speed R of the compressor 100 is decreased so that the present heating capacity of step S680 is maintained at step S721. Next, at step S731, the effective efficiency $\eta_n$ of the refrigerant cycle is calculated by the same way as step S680. Next, at step S741, the preceding effective efficiency $\eta_{n-1}$ calculated at the last time of step S701 and the present effective efficiency $\eta_n$ calculated at step S731 are compared, so that it is determined whether or not the present effective efficiency $\eta_n$ calculated at step S731 is larger than the preceding effective efficiency $\eta_{n-1}$ calculated at step S701. When the present effective efficiency $\eta_n$ is larger than the preceding effective efficiency $\eta_{n-1}$, the opening degree of the pressure control valve 300 is decreased so that the refrigerant pressure Ph at the high-pressure side is further increased by a predetermined pressure (e.g., 0.1 MPa), and thereafter, the rotation speed R of the compressor 100 is decreased again so that the present heating capacity of step S680 is maintained, at step S721. Thereafter, the present effective efficiency $\eta_n$ is calculated again at step S731, and the preceding effective efficiency $\eta_{n-1}$ calculated at the preceding time at step S731 and the present effective efficiency $\eta_n$ calculated at the present time at step S731 are compared at step S741. That is, until the present effective efficiency $\eta_n$ calculated at the present time becomes equal to or lower than the preceding effective efficiency $\eta_{n-1}$ calculated at the preceding time before one time from the present time, the operation control of steps S721–S741 is repeated.

When it is determined that the present effective efficiency $\eta_n$ calculated at the present time is equal to or lower than the preceding effective efficiency $\eta_{n-1}$ calculated at the preceding time before one time from the present time at step S741, the operation control at step S750 in FIG. 13 is performed. Thus, in the third embodiment, the effect similar to that of the above-described second embodiment can be obtained.

Figure 16:
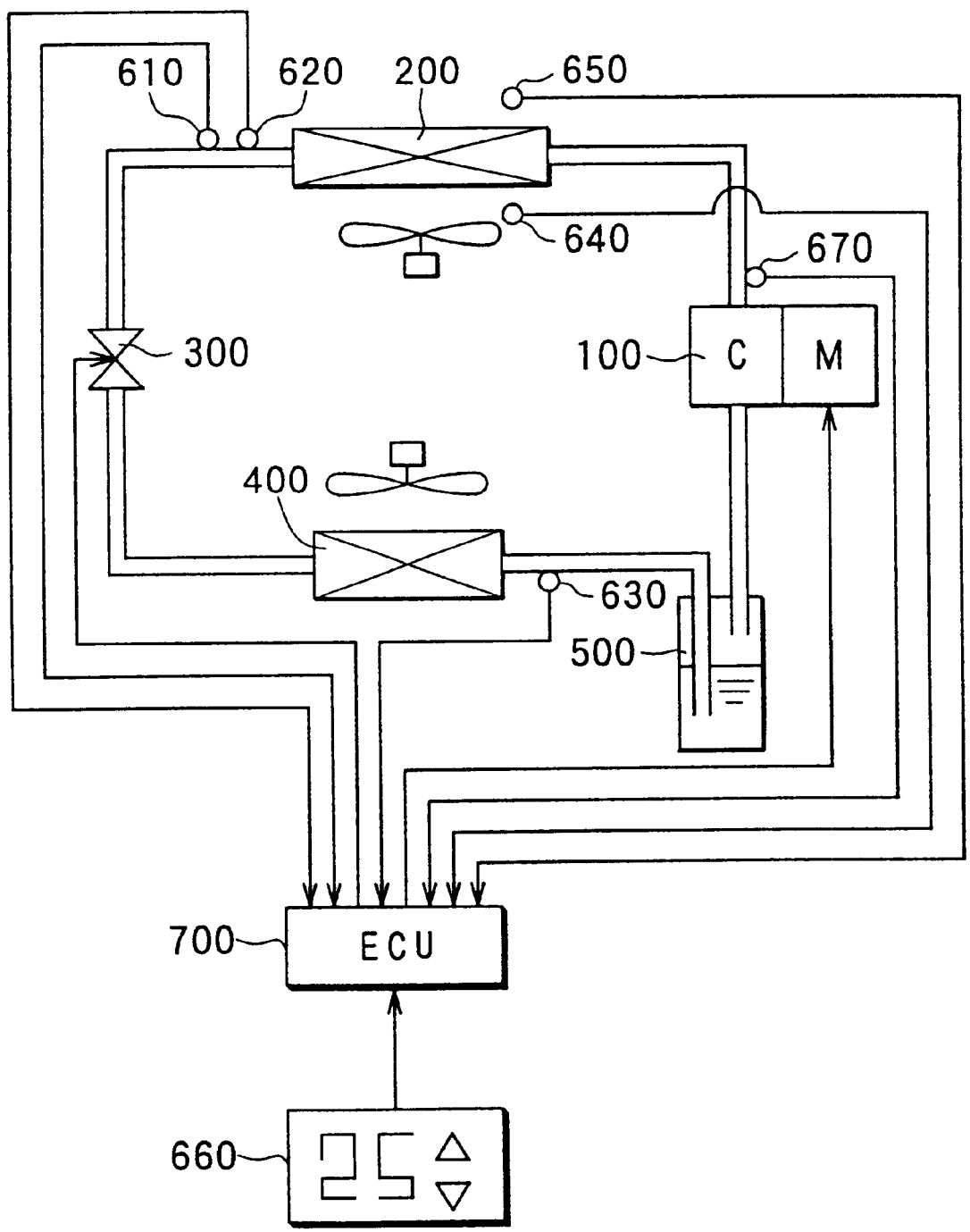
FIG. 16 is a schematic diagram of a super-critical refrigerant cycle according to a fourth preferred embodiment of the present invention.

A fourth preferred embodiment of the present invention will be now described with reference to FIGS. 16 and 17. In a refrigerant cycle of the fourth embodiment, a refrigerant temperature sensor 670 for detecting temperature of refrigerant immediately after having been discharged from the compressor 100 is further disposed as compared with the structure of the refrigerant cycle described in the first embodiment. In the fourth embodiment, the refrigerant amount discharged from the compressor 100 and the opening degree of the pressure control valve 300 are controlled, so that the effective efficiency $\eta$ is increased as larger as possible while temperature detected by the refrigerant temperature sensor 670 becomes equal to or lower than a predetermined temperature Tdo (e.g., about 150° C., in the fourth embodiment).

Next, the control operation of the refrigerant cycle according to the fourth embodiment will be now described with reference to FIG. 17. In the fourth embodiment, the control steps from step S680 described in the above second embodiment are changed. That is, the control operation described at steps S500–S670 in the second embodiment is similar to that in the fourth embodiment.

Figure 12:
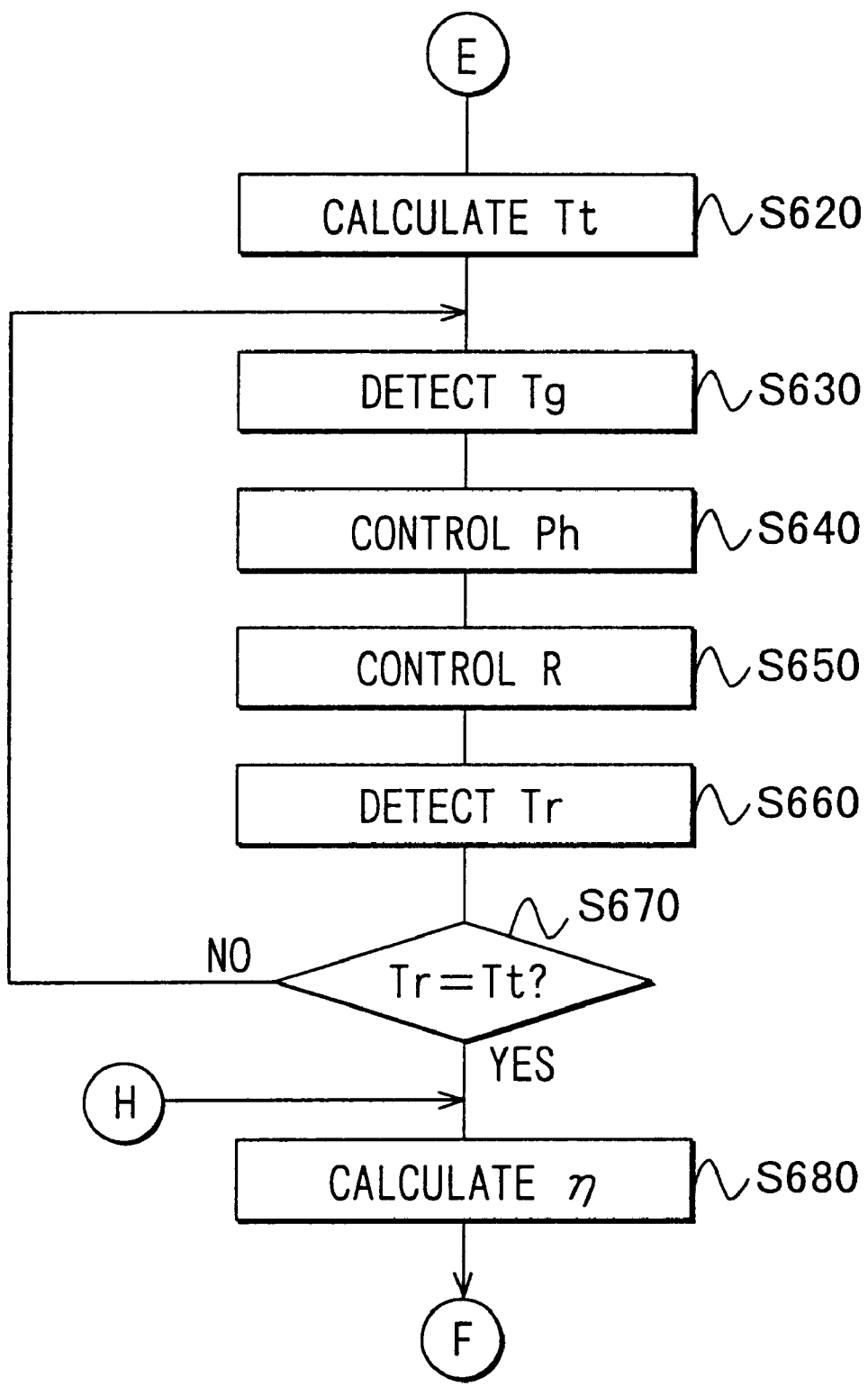
FIG. 12 is a flow diagram showing control operation of the super-critical refrigerant cycle according to the second embodiment.
Figure 17:
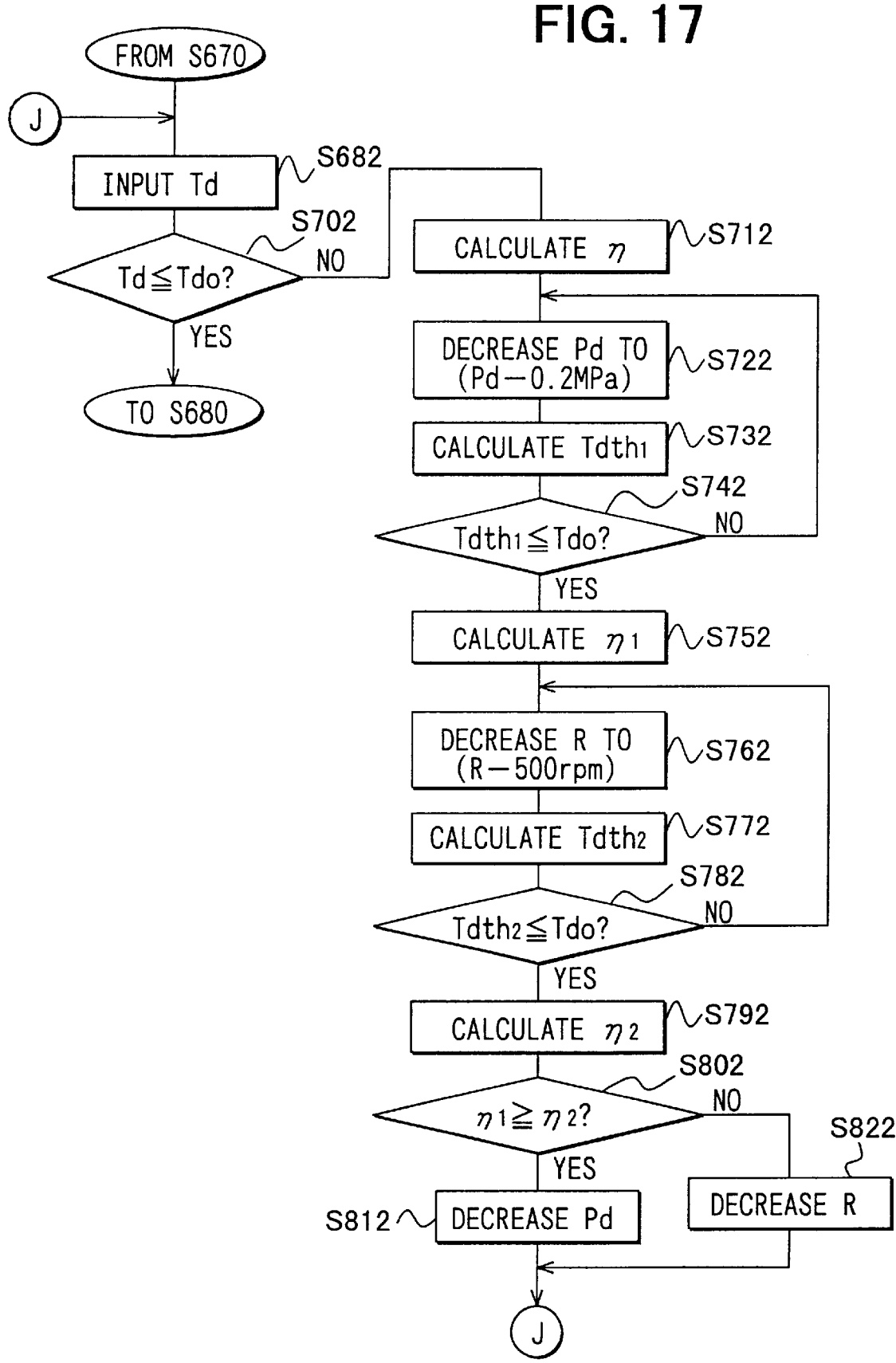
FIG. 17 is a flow diagram showing control operation of the super-critical refrigerant cycle according to the fourth embodiment.

As shown in FIG. 17, after step S670 in FIG. 12, a temperature Td of refrigerant discharged immediately from the compressor 100 is detected by the refrigerant temperature sensor 670, and is input at step S682. Next, at step S702, it is determined whether or not the detected refrigerant temperature Td is equal to or less than a predetermined temperature Tdo. When it is determined that the refrigerant temperature Td is equal to or less than the predetermined temperature Tdo at step S702, the control operation from step S680 in the second embodiment is performed.

On the other hand, when it is determined that the refrigerant temperature Td is higher than the predetermined temperature Tdo at step S702, the effective efficiency $\eta$ (i.e., effective coefficient of performance) of the refrigerant cycle is calculated at step S712 similarly to the above-described first embodiment. Next, at steps S722 and S723, when the opening degree of the pressure control valve 300 is increased so that the refrigerant pressure Pd is decreased by a predetermined pressure (e.g., 0.2 MPa) while the refrigerant amount discharged from the compressor 100 is not changed, the refrigerant temperature Td at the high-pressure side is calculated (simulated). That is, the refrigerant pressure Pd is decreased by the predetermined pressure (e.g., 0.2 MPa) at step S722, and a first theoretical refrigerant temperature Tdth1 is calculated at step S732 provided that the refrigerant amount (rotation speed R) discharged from the compressor 100 is not changed.

Next, at step S742, the first theoretical refrigerant temperature Tdth1 and the predetermined temperature Tdo are compared. When the first theoretical refrigerant temperature Tdth1 is larger than the predetermined temperature Tdo at step S742, the control operation of steps S722–S742 is repeated. When the first theoretical refrigerant temperature Tdth1 is equal to or smaller than the predetermined temperature Tdo at step S742, the effective efficiency $\eta1$ (i.e., effective coefficient of performance) of the refrigerant cycle is calculated at step S752 under the simulation condition similarly to the calculation of step S712. Next, at step S762, the rotation speed of the compressor 100 is decreased by a predetermined rotation speed (e.g., 500 rpm) so that the refrigerant amount discharged from the compressor 100 is decreased, while the refrigerant pressure at the high-pressure side of the refrigerant cycle is not changed. In this state, at step S772, a second theoretical refrigerant temperature Tdth2 at the high-pressure side is calculated at step S772.

Next, at step S782, the second theoretical refrigerant temperature Tdth2 and the predetermined temperature Tdo are compared. When the second theoretical refrigerant temperature Tdth2 is larger than the predetermined temperature Tdo at step S782, the control operation of steps S762–S782 is repeated. When the second theoretical refrigerant temperature Tdth2 is equal to or smaller than the predetermined temperature Tdo at step S782, the effective efficiency $\eta2$ (i.e., effective coefficient of performance) of the refrigerant cycle is calculated at step S792 under the simulation condition similarly to the calculation of step S712. Next, at step S802, the effective efficiency $\eta1$ calculated at step S752 and the effective efficiency $\eta2$ calculated at step S792 are compared. When the effective efficiency $\eta1$ calculated at step S752 is equal to or larger than the effective efficiency $\eta2$, the opening degree of the pressure control valve 300 is increased so that the refrigerant pressure Pd is decreased at step S812. On the other hand, when the effective efficiency $\eta1$ calculated at step S752 is smaller than the effective efficiency $\eta2$, the rotation speed R of the compressor 100 is decreased so that the refrigerant amount discharged from the compressor 100 is decreased. Thereafter, the control operation returns to step S682.

According to the fourth embodiment of the present invention, the refrigerant amount discharged from the compressor 100 and the opening degree of the pressure control valve 300 are controlled, so that the effective efficiency $\eta$ of the refrigerant cycle becomes larger while the refrigerant temperature at the high-pressure side is made equal to or lower than the predetermined temperature Tdo. Accordingly, it can prevent the components of the super-critical refrigerant cycle from being troubled by heat, while the effective efficiency $\eta$ of the refrigerant cycle is increased.

A fifth preferred embodiment of the present invention will be now described with reference to FIGS. 18 and 19. In the above-described first embodiment, the super-critical refrigerant cycle is applied to the air conditioner for heating. However, in the fifth embodiment, a super-critical refrigerant cycle is typically applied to an air conditioner for cooling. In the super-critical refrigerant cycle of the fifth embodiment, inside air inside the compartment is heat exchanged with refrigerant in the evaporator 400 to be cooled by the evaporator 400. On the other hand, in the radiator 200, refrigerant is heat exchanged with outside air outside the compartment, so that refrigerant heat absorbed in the evaporator 400 is radiated to the outside air in the radiator 200. Further, the inlet air temperature sensor 640 and the outlet air temperature sensor 650 are provided at air inlet and outlet sides of the evaporator 400, respectively. In the fifth embodiment, the other components of the super-critical refrigerant cycle are similar to those in the super-critical refrigerant cycle described in the first embodiment. Further, the other control operation, except for the refrigerant pressure control at the high-pressure side shown at steps S230–S270, is similar to that of the air conditioner for heating described in the first embodiment.

Next, the control operation different from the control at step S240 in FIG. 3 of the first embodiment is mainly described. FIG. 18 shows a part of control operation of the super-critical refrigerant cycle according to the fifth embodiment, different from the control operation of the super-critical refrigerant cycle of the first embodiment. In the control steps of FIG. 18, the steps similar to those in FIG. 3 of the first embodiment are indicated with the same step numbers.

Figure 18:
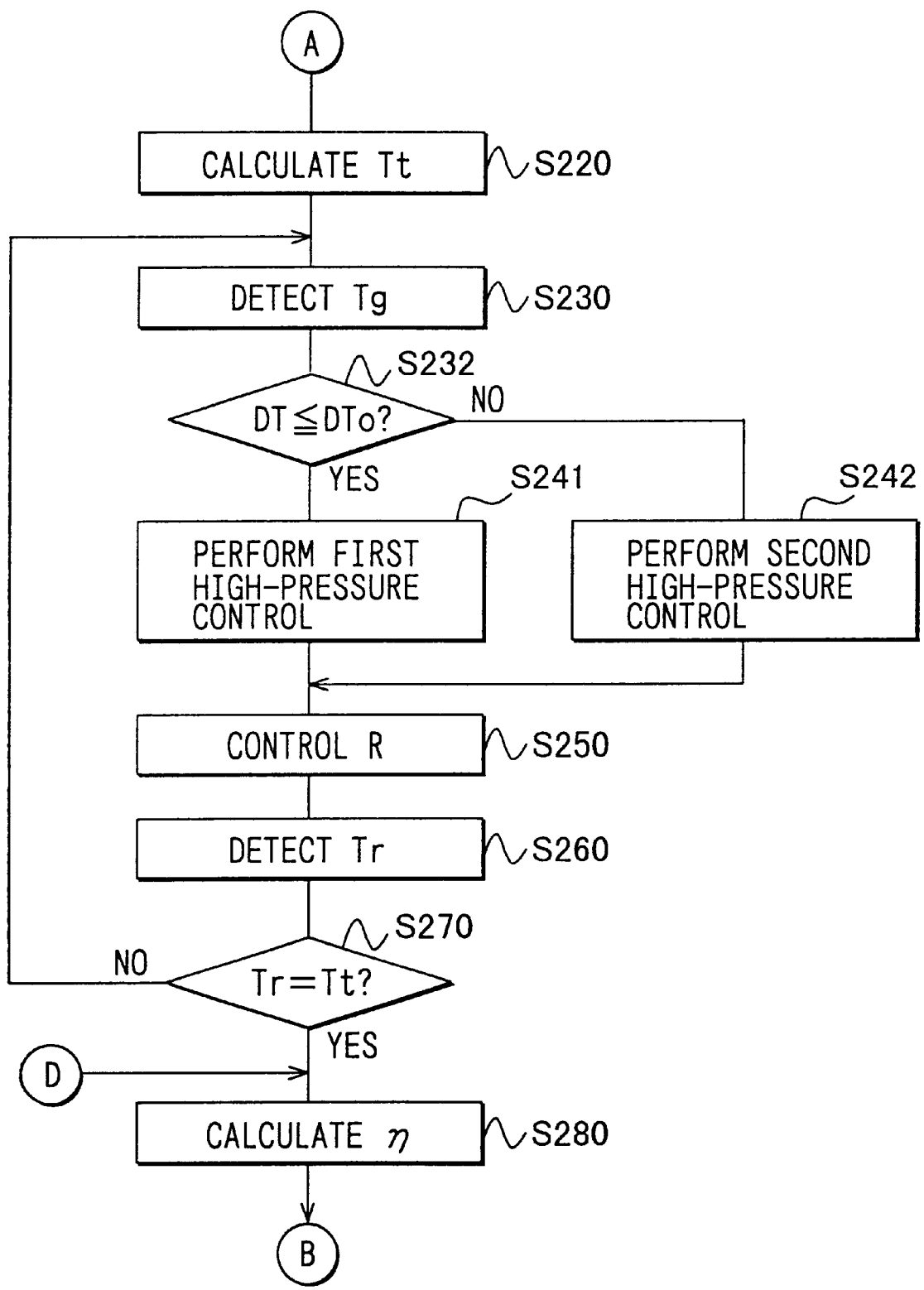
FIG. 18 is a flow diagram showing control operation of a super-critical refrigerant cycle according to a fifth preferred embodiment of the present invention.

As shown in FIG. 18, after the target temperature Tt of air blown toward the compartment is calculated at step S220, the refrigerant temperature Tg at the refrigerant outlet side of the radiator 200 is detected by the refrigerant temperature sensor 610 at step S230. Next, at step S232, it is determined whether or not a driving torque DT from the inverter to the electrical motor M of the compressor 100 is equal to or less than a predetermined torque DTo. In the fifth embodiment, the driving torque DT of the compressor 100 (the electrical motor M) includes an actually generated driving torque in the air conditioner, and a control target driving torque of the ECU 700 which is not actually generated. Further, the predetermined torque DTo is determined based on the maximum torque in the compressor 100 (i.e., electrical motor M).

When it is determined that the driving torque DT from the inverter to the electrical motor M of the compressor 100 is equal to or less than the predetermined torque DTo at step S232, a first high-pressure control is performed at step S241. That is, at step S241, the opening degree of the pressure control valve 300 is controlled so that the refrigerant temperature Tg and the refrigerant pressure Ph at the outlet side of the radiator 200 have the relationship shown by the suitable control line η in FIG. 6. Thereafter, the rotation speed R of the compressor 100 is controlled at step S250 so that air temperature Tr blown from the evaporator 400 to the compartment becomes equal to the target temperature Tt.

On the other hand, when it is determined that the driving torque DT from the inverter to the electrical motor M of the compressor 100 is larger than the predetermined torque DTo at step S232, a second high-pressure control is performed at step S242. That is, at step S242, the opening degree of the pressure control valve 300 is controlled so that the refrigerant pressure Ph at the outlet side of the radiator 200 becomes lower by a predetermined pressure (e.g., 1.1 MPa) than a target pressure Tp determined based on the relationship between the suitable control line η and the refrigerant temperature Tg. Thereafter, the rotation speed R of the compressor 100 is controlled at step S250 so that air temperature Tr blown from the evaporator 400 to the compartment becomes equal to the target temperature Tt. The cooling capacity generated by the evaporator 400 is the product of an enthalpy difference between a refrigerant outlet side and a refrigerant inlet side of the evaporator 400, and a refrigerant amount flowing through the evaporator 400. Therefore, the meaning that the rotation speed R of the compressor 100 is controlled so that the air temperature Tr blown into the compartment becomes the target temperature Tt is the same as the meaning that the refrigerant amount flowing through the evaporator 400 is controlled so that the cooling capacity generated by the evaporator 400 becomes a predetermined capacity.

According to the fifth embodiment of the present invention, when the air amount passing through the radiator 200 is small, or when the temperature of air for cooling the radiator 200 is increased, the refrigerant pressure Ph at the outlet side of the radiator 200 is increased. In this case, the opening degree of the pressure control valve 300 is controlled so that the refrigerant pressure Ph at the outlet side of the radiator 200 is increased along the suitable control line η. However, with the increase of the refrigerant pressure Ph at the outlet side of the radiator 200, a necessary torque for driving the compressor 100 is increased, an inverter electrical current supplied to the electrical motor M is increased, and over-electrical current may be supplied to the inverter circuit.

Actually, before over-electrical current is applied to the inverter, a prevention circuit is operated, and the inverter electrical current is not increased. Accordingly, the refrigerant pressure at the outlet side of the radiator 200 is not increased, and therefore, the opening degree of the pressure control valve 300 is further reduced. As a result, refrigerant amount circulating in the refrigerant cycle is decreased, and cooling capacity is not increased. To overcome this problem, the capacity of the inverter may be increased, or the electrical motor M may be enlarged. However, in this case, the cost for manufacturing the air conditioner is increased.

According to the fifth embodiment of the present invention, the pressure control valve 300 and the rotation speed R of the compressor 100 are controlled so that the driving torque of the compressor 100 is equal to or lower than a predetermined torque. Therefore, even when the air amount flowing into the radiator 200 is small or even when the temperature of air passing through the radiator 200 is high, a predetermined cooling capacity can be obtained while the air conditioner is manufactured in low cost.

The driving torque DT is indicated by the following formula (1) and (2).

$$DT = k \cdot P_{low}(\alpha^n - 1) \quad (1)$$

$$\alpha(\text{compression ratio}) = Ph/P_{low} \quad (2)$$

Here, n>0, k is coefficient determined by a compressor, $P_{low}$ indicates a low-pressure side refrigerant pressure of a super-critical refrigerant cycle from the outlet side of the pressure control valve 300 to the suction side of the compressor 100, and $P_h$ indicates a high-pressure side refrigerant pressure of the super-critical refrigerant cycle from the outlet side of the compressor 100 to the inlet side of the pressure control valve 300. When the opening degree of the pressure control valve 300 becomes larger and the high-pressure-side refrigerant pressure Ph is lowered, the low-pressure side refrigerant pressure $P_{low}$ is increased. However, in this case, because the compression ratio α becomes smaller, the driving torque DT of the compressor 100 becomes smaller. On the other hand, when the rotation speed of the compressor 100 is increased, pressure loss (decompression degree) in the pressure control valve 300 becomes larger, and the low-pressure side refrigerant pressure $P_{low}$ is decreased. However, in this case, the compression ratio α becomes larger, the driving torque DT of the compressor 100 is increased.

Figure 19:
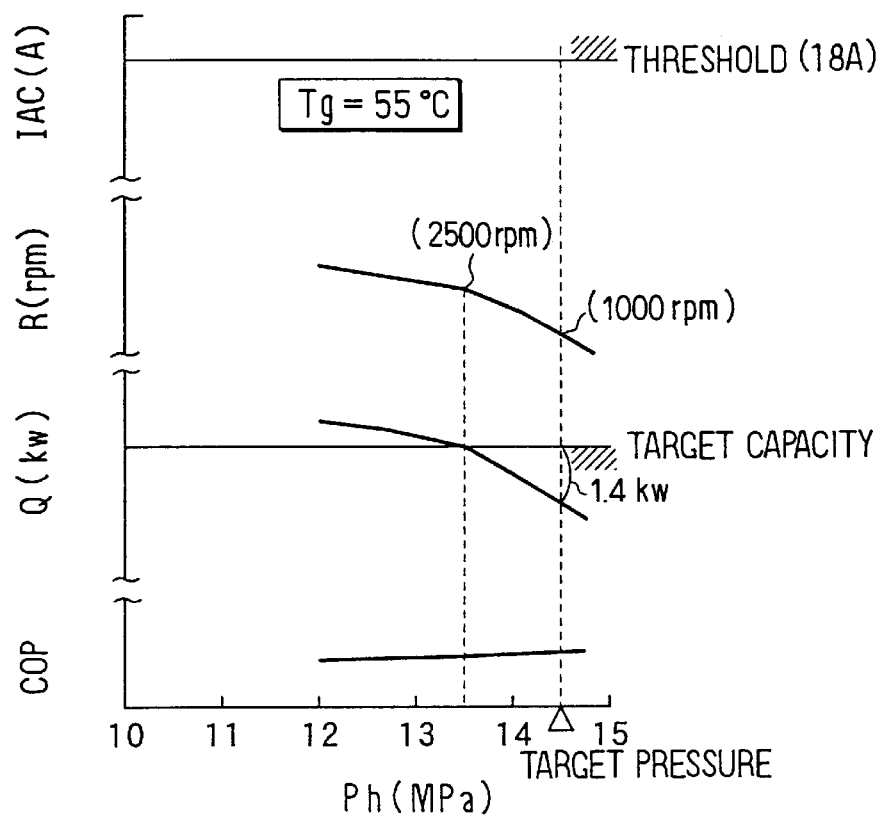
FIG. 19 is a graph showing relationships between a high-pressure side refrigerant pressure (Ph), coefficient of performance (COP) of the refrigerant cycle, cooling capacity (Q), a rotation speed (rotation number Nc) of a compressor, and inverter current (IAC), according to the fifth embodiment.

Thus, as shown in FIG. 19, when the driving torque DT is at the threshold state, the driving torque DT (e.g., inverter current IAC 18A) has a constant value. In this case, as shown in FIG. 9, by increasing the rotation speed of the compressor 100 from 1000 rpm to 2500 rpm, cooling capacity Q is increased by 1.4 KW, and a target cooling capacity can be obtained.

In the first high-pressure control area, the refrigerant temperature Tg at the outlet of the radiator 200 is set to be lower than a predetermined temperature (e.g., 45° C. in the fifth embodiment). In FIG. 19, the refrigerant temperature Tg is 55° C., and the second high-pressure control where the driving torque DT to be necessary is larger than the predetermined torque DTo is set. In the second high-pressure control, even when the high-pressure side refrigerant pressure Ph and the refrigerant temperature Tg at the outlet side of the radiator 200 do not have the relationship shown by the suitable control line η, the coefficient (COP) of performance of the refrigerant cycle is not greatly deteriorated, as shown in FIG. 9.

Figure 20:
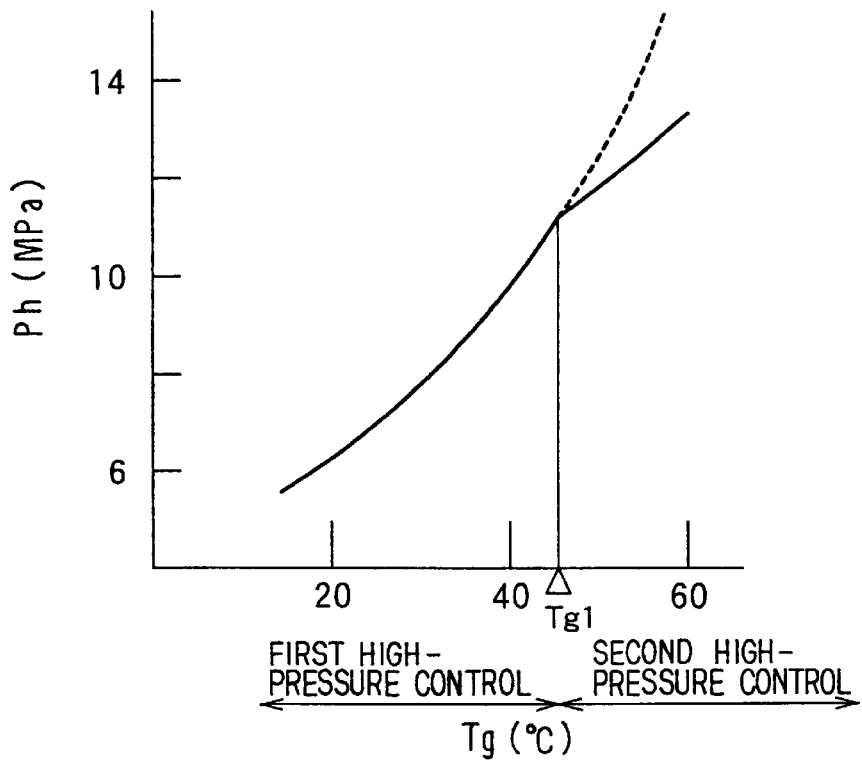
FIG. 20 is a graph showing a relationship between a refrigerant temperature Tg at an outlet side of a radiator and a high-pressure side refrigerant pressure Ph in a super-critical refrigerant cycle according to a sixth preferred embodiment of the present invention.

A sixth preferred embodiment of the present invention will be now described with reference to FIG. 20. As described in the fifth embodiment, the driving torque DT of the compressor 100 is increased in accordance with an increase of the high-pressure side refrigerant pressure Ph. Further, in a case where the radiating capacity of the radiator 200 is not greatly changed, when the high-pressure side refrigerant pressure Ph increases, the refrigerant temperature Tg at the outlet side of the radiator 200 is increased.

Thus, in the sixth embodiment, the second high-pressure control described at step S242 in FIG. 18 of the fifth embodiment is performed when the refrigerant temperature Tg at the outlet of the radiator 200 is higher than a predetermined temperature Tg1 (e.g., 45° C. in the sixth embodiment). That is, when the refrigerant temperature Tg at the outlet of the radiator 200 is higher than the predetermined temperature Tg1 (e.g., 45° C.), it is determined that the driving torque DT is larger than the predetermined torque, and the second high-pressure control is performed, as shown by the solid line in FIG. 20. On the other hand, when the refrigerant temperature Tg at the outlet of the radiator 200 is lower than the predetermined temperature (e.g., 45° C.), it is determined that the driving torque DT is lower than the predetermined torque, and the first high-pressure control is performed, as shown in FIG. 20. In FIG. 20, the chain line indicates a comparison without a correction. In the sixth embodiment, the other parts are similar to those of the above-described fifth embodiment.

Figure 21:
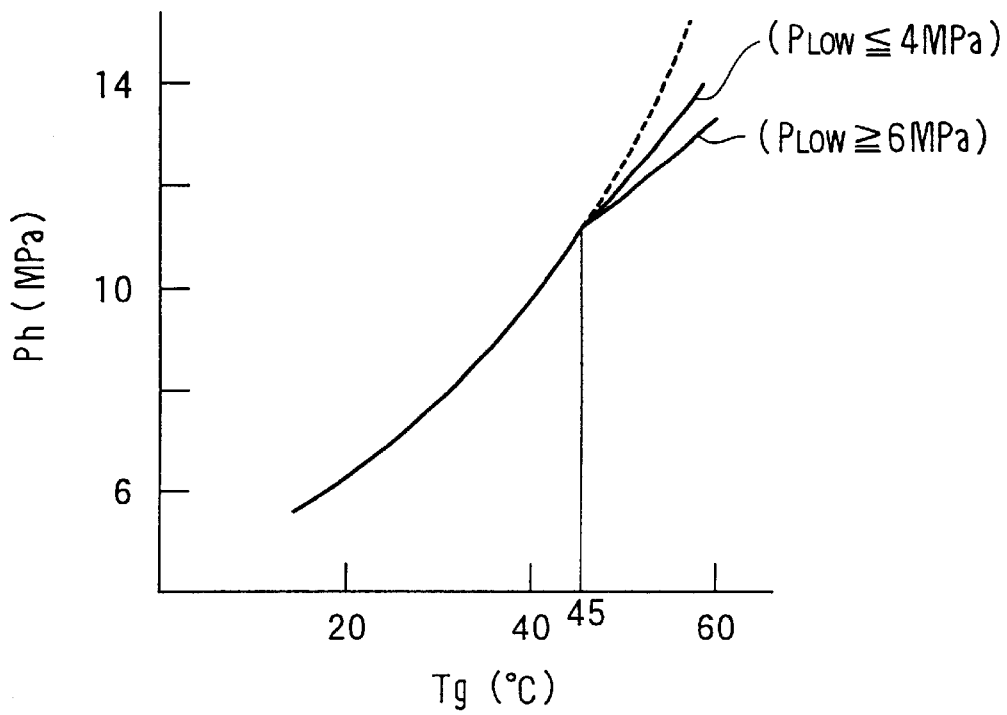
FIG. 21 is a graph showing a relationship between a refrigerant temperature Tg at an outlet side of a radiator and a high-pressure side refrigerant pressure Ph in a super-critical refrigerant cycle according to a seventh preferred embodiment of the present invention.

A seventh preferred embodiment of the present invention will be now described with reference to FIG. 21. As described in the fifth embodiment, the driving torque DT of the compressor 100 is changed with a change of the low-pressure side refrigerant pressure $P_{low}$. For example, when the temperature or the amount of air flowing into the evaporator 400 is changed, the refrigerant pressure $P_{low}$ is changed, and the driving torque DT of the compressor 100 is changed. Thus, in the seventh embodiment of the present invention, when the refrigerant temperature Tg at the outlet side of the radiator 200 is higher than a predetermined temperature (e.g., 45° C.), a target high pressure determined based on the suitable control line η and the refrigerant temperature Tg is corrected to be decreased. The pressure correction amount for reducing the target high pressure becomes larger as the low-pressure side refrigerant pressure $P_{low}$ becomes higher. For example, as shown in FIG. 21, when the refrigerant pressure $P_{low}$ is equal to or higher than 6 MPa, the pressure correction amount for reducing the target high pressure becomes larger as compared with a case where the refrigerant pressure $P_{low}$ is equal to or lower than 4 MPa. In FIG. 21, the chain line indicates a comparison without a correction.

In the seventh embodiment, the other parts are similar to those of the above-described fifth and sixth embodiments of the present invention.

Figure 22:
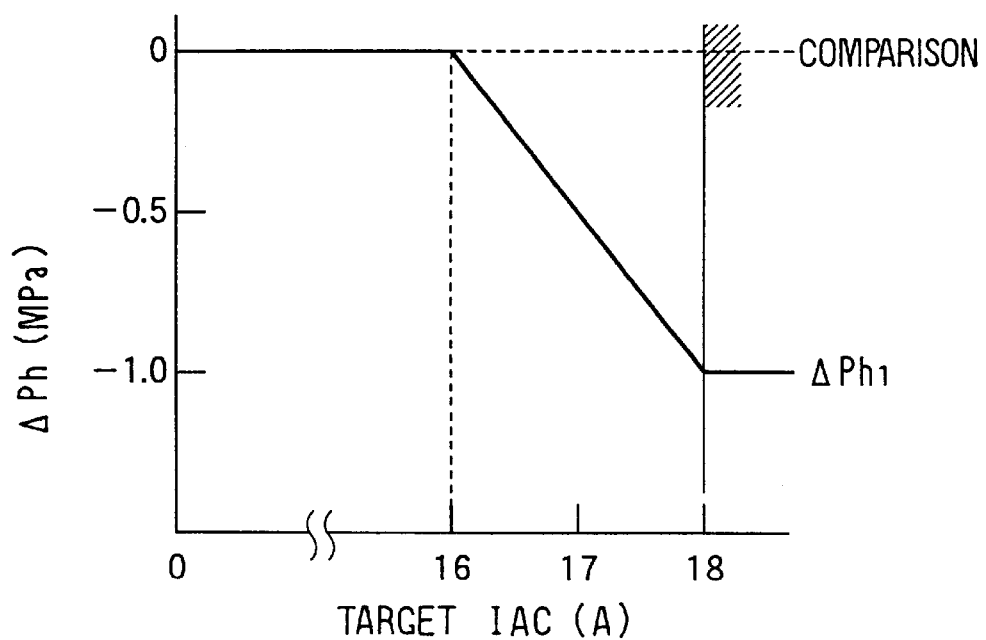
FIG. 22 is a graph showing a relationship between a target inverter current IAC and a pressure correction amount $\Delta ph$ in a super-critical refrigerant cycle according to an eighth preferred embodiment of the present invention.

An eighth preferred embodiment of the present invention will be now described with reference to FIG. 22. In the above-described fifth through seventh embodiments of the present invention, when the driving torque DT of the compressor 100 becomes larger than the predetermined torque DTo, or when the refrigerant temperature Tg at the outlet side of the radiator 200 becomes larger than the predetermined temperature, the second high-pressure control is performed. In the eighth embodiment, a target inventer current (IAC) to be supplied to the electrical motor M is larger than a predetermined current (e.g., 16A in the eighth embodiment), a pressure correction amount Δph1 relative to the target inverter current IAC is determined, as shown by the solid line in FIG. 22. Further, the pressure control valve 300 is controlled so that the target high pressure Ph is decreased by the pressure correction amount Δph1. As shown in FIG. 22, when the target inventer current IAC to be supplied to the electrical motor M is larger than the predetermined current (e.g., 16A in the eighth embodiment), the pressure correction amount |Δph1| of the target high pressure Ph is increased. As shown in FIG. 22, in a comparison case, the target high pressure is not corrected.

In the eighth embodiment, after the high-pressure side refrigerant pressure Ph is corrected by the pressure control valve 300, the rotation speed of the compressor 100 is controlled so that the air temperature Tr blown into the compartment becomes the target temperature Tt.

Figure 23:
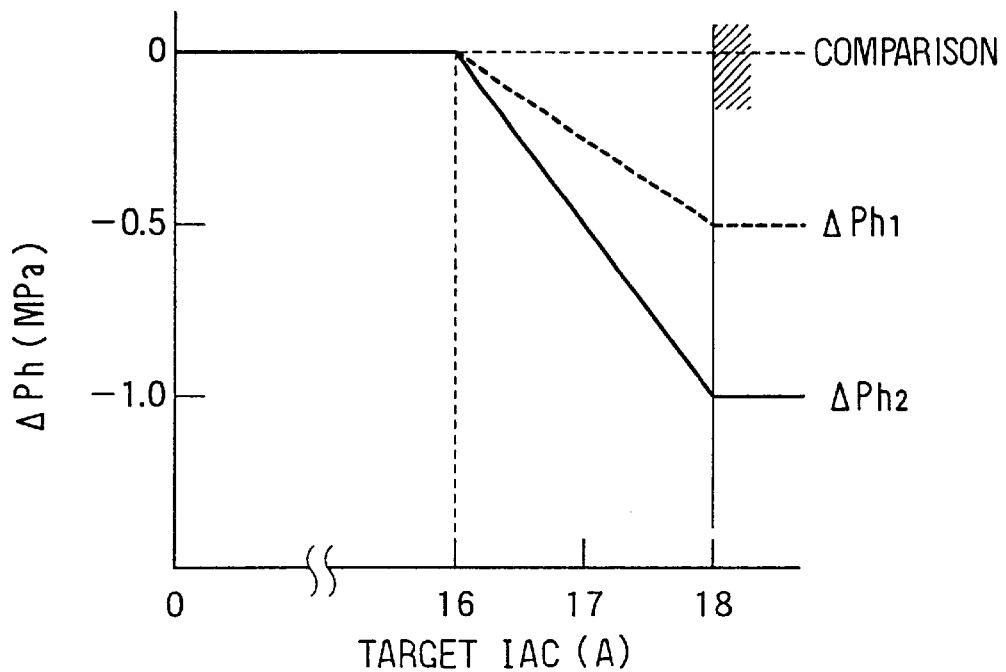
FIG. 23 is a graph showing a relationship between a target inverter current IAC and a pressure correction amount $\Delta ph$ in a super-critical refrigerant cycle according to a ninth preferred embodiment of the present invention.

A ninth preferred embodiment of the present invention will be now described with reference to FIG. 23. In the ninth embodiment, when the pressure correction amount Δph is determined based on the target inverter current similarly to the above-described eighth embodiment, the pressure correction amount Δph is set to become larger as the low-pressure side refrigerant pressure $P_{low}$ becomes higher. For example, as shown in FIG. 23, when the refrigerant pressure $P_{low}$ is equal to or higher than 6 MPa, the pressure correction amount for reducing the target high pressure is set at Δph2 changed with the inverter current IAC(A). On the other hand, when the refrigerant pressure $P_{low}$ is equal to or lower than 4 MPa, the pressure correction amount for reducing the target high pressure is set at Δph1 changed with the inverter current IAC(A). The pressure correction amount Δph2 is larger than the pressure correction amount Δph1 as shown in FIG. 23. In the ninth embodiment, the other parts are similar to those of the above-described eighth embodiment.

A tenth preferred embodiment of the present invention will be now described with reference to FIG. 24. In the tenth embodiment, the control of the high-pressure side refrigerant pressure Ph shown at steps S230–S270 in FIG. 3 of the first embodiment is changed. That is, the control of the high-pressure side refrigerant pressure at step S240 is mainly different. The other parts of the tenth embodiment are similar to those of the above-described first embodiment.

Next, the different points different from the control of the high-pressure side refrigerant pressure of the first embodiment are mainly described. During a heating operation of the refrigerant cycle, when a temperature difference ΔT (Tg−Ta) between the refrigerant temperature Tg at the outlet side of the radiator 200 and the temperature Ta of air passing through the radiator 200 to be heat-exchanged with refrigerant is equal to or larger than a predetermined temperature difference ΔTo, the rotation speed of the compressor 100 is decreased so that the flow amount discharged from the compressor 100 is decreased as compared with a case where the temperature difference ΔT (Tg−Ta) is smaller than the predetermined temperature difference ΔTo. Further, when the temperature difference ΔT (Tg−Ta) is equal to or larger than the predetermined temperature difference ΔTo, the opening degree of the pressure control valve 300 is corrected and controlled so that the high-pressure side refrigerant pressure Ph becomes higher than the target high-pressure side refrigerant pressure determined based on the refrigerant temperature Tg at the outlet side of the radiator 200 in accordance with the suitable control line η.

Figure 24:
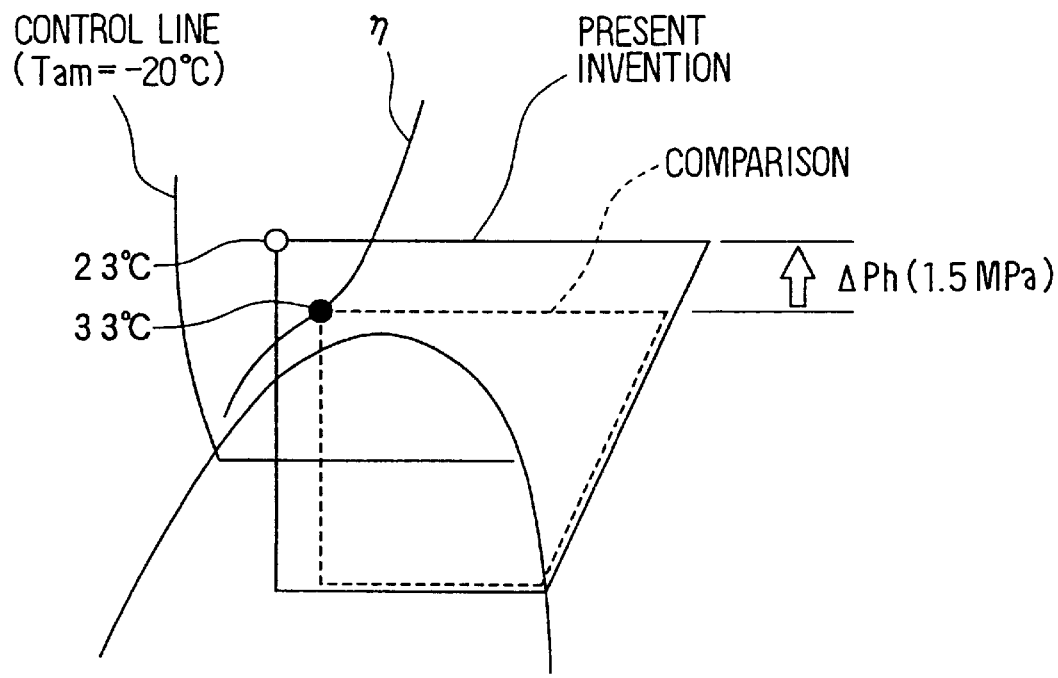
FIG. 24 is a Mollier diagram (p-h diagram) of a carbon dioxide refrigerant cycle according to a tenth preferred embodiment of the present invention.

As shown in FIG. 24, when the refrigerant temperature Tg at the outlet side of the radiator 200 is 33° C., the temperature difference ΔT (Tg–Ta) becomes larger as compared with a case where the refrigerant temperature Tg is 23° C. In this case, the pressure control valve 300 is controlled so that the high-pressure side refrigerant pressure Ph becomes higher than the target high pressure determined based on the refrigerant temperature Tg and the suitable control line η. For example, in FIG. 24, the high-pressure side refrigerant pressure Ph is increased by 1.5 MPa as compared with the target high pressure.

For example, when the temperature of air passing through the radiator 200 is lower than the refrigerant temperature at the outlet side of the radiator 200, it means that a part of heat quantity possible to be transmitted from refrigerant to air stays in the refrigerant, and heating efficiency of the refrigerant cycle does not becomes higher. Here, the heating efficiency is a ratio of a heat energy amount recovering as the heating capacity to all energy used for a super-critical refrigerant cycle.

When the flow amount of refrigerant discharged from the radiator 200 is large, the refrigerant flow speed within the radiator 200 becomes faster, a heat-exchanging time for which refrigerant and air are heat-exchanged becomes shorter, and therefore, a sufficient heat quantity is not transmitted from refrigerant to heat in the radiator 200. On the other hand, when the flow amount of refrigerant discharged from the compressor 100 becomes smaller, heat quantity transmitted from refrigerant to air is increased while refrigerant passes through the radiator 200, and the heat-exchanging efficiency is increased in the radiator 200. However, in this case, because the flow amount of refrigerant discharged from the compressor is decreased, absolute heat quantity of refrigerant to be transmitted to air is reduced, and the heat capacity is decreased.

According to the tenth embodiment of the present invention, when the temperature difference ΔT (Tg–Ta) is equal to or larger than the predetermined temperature To, the rotation speed of the compressor 100 is decreased so that the flow amount of refrigerant discharged from the compressor 100 is decreased as compared with a case where the temperature difference ΔT (Tg–Ta) is smaller than the predetermined temperature To. Further, the pressure control valve 300 is controlled so that the target high-pressure side refrigerant pressure Ph becomes higher than a target pressure determined based on the refrigerant temperature Tg at the outlet side of the radiator 200 in accordance with the suitable control line η. For example, in a case shown in FIG. 24, the pressure control valve 300 is corrected when the refrigerant temperature Tg is 33° C. so that the target high-pressure side refrigerant pressure is increased by ΔPh (e.g., 1.5 Mpa). Therefore, heat-exchanging efficiency of the radiator 200 is improved, and heating efficiency is improved, as compared with a comparison example where the target high-pressure side refrigerant pressure is not corrected.

In the tenth embodiment, preferably, the temperature of air passing through the radiator 200 is detected at a downstream air side of the radiator 200. However, by suitably selecting the predetermined temperature difference ΔTo, the air temperature detected at an upstream air side of the radiator 200 may be used.

Figure 25:
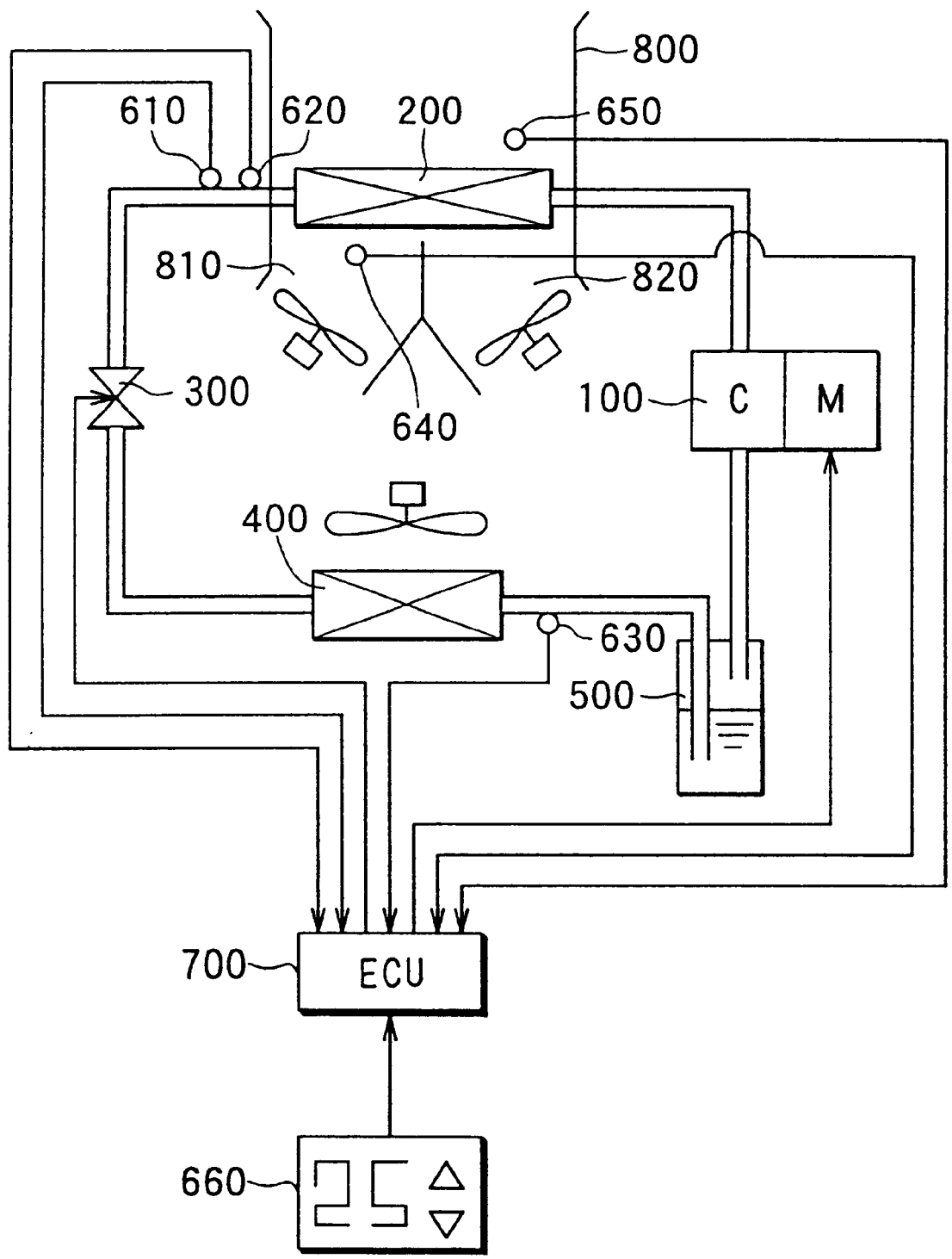
FIG. 25 is a schematic diagram of an air conditioner with a super-critical refrigerant cycle according to an eleventh preferred embodiment of the present invention.

An eleventh preferred embodiment of the present invention will be now described with reference to FIGS. 25–28B. In the eleventh embodiment, the present invention is typically applied to an air conditioner for a vehicle. As shown in FIG. 25, an air conditioning case 800 for defining an air passage through which air is blown into a passenger compartment is disposed. Further, an upstream air passage of the radiator 200 is partitioned into an outside air passage 810 through which outside air outside the passenger compartment is introduced, and an inside air passage 820 through which inside air inside the passenger compartment is introduced. Further, the outside air passage 810 is provided at the refrigerant outlet side of the radiator 200, and the inside air passage 820 is provided at the refrigerant inlet side of the radiator 200. The radiator 200 is disposed within the air conditioning case 800. In the eleventh embodiment, the other components of the refrigerant cycle are similar to those of the above-described first embodiment. In the eleventh embodiment, during the control of the high-pressure side refrigerant shown at steps S230–S270 in the first embodiment, the pressure control valve 300 and the compressor 100 are controlled as described later.

That is, in a state where outside air is introduced at least into the outside air passage 810, the pressure control valve 300 is controlled so that the high-pressure side refrigerant pressure Ph becomes a target high-pressure side refrigerant pressure determined based on an outside air temperature detected by the inlet air temperature sensor 640, and the rotation speed of the compressor 100 is controlled so that the temperature Tr of air blown into the passenger compartment becomes the target temperature Tt.

Figure 26A:
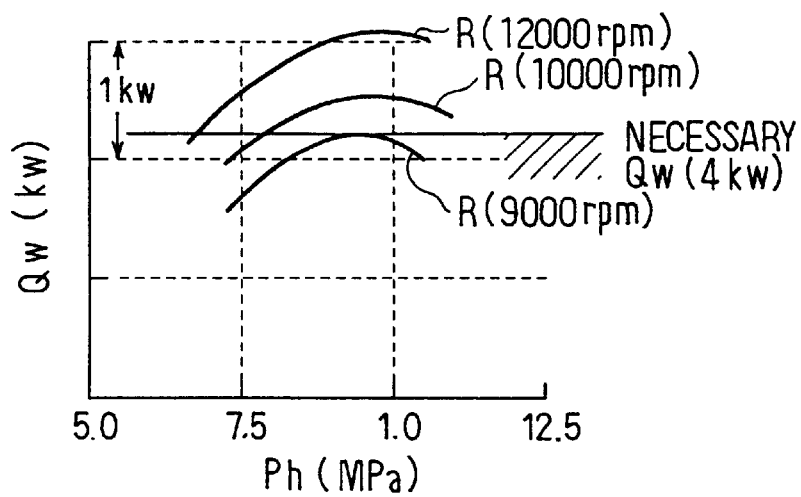
FIG. 26A is a graph showing a relationship between heating capacity Qw and a high-pressure side refrigerant pressure Ph when an outside air temperature is –20° C.
Figure 26B:
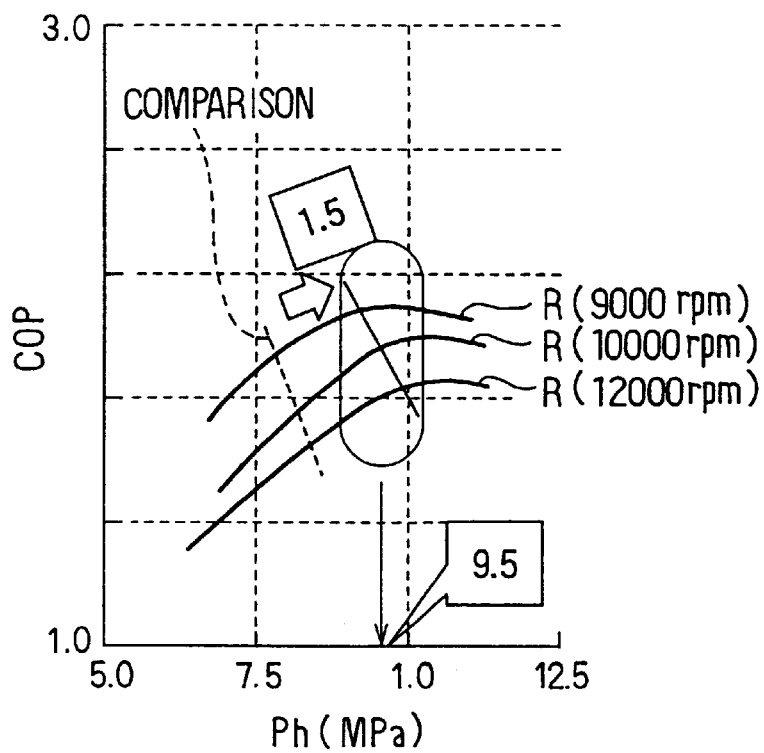
FIG. 26B is a graph showing a relationship between coefficient (COP) of performance of a refrigerant cycle and the high-pressure side refrigerant pressure Ph when the outside air temperature is –20° C., according to the eleventh embodiment of the present invention.
Figure 27A:
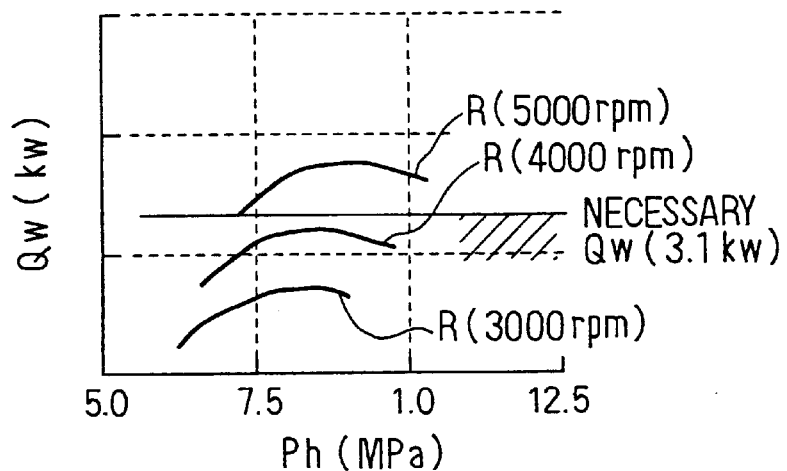
FIG. 27A is a graph showing the relationship between the heating capacity Qw and the high-pressure side refrigerant pressure Ph when the outside air temperature is –10° C.
Figure 27B:
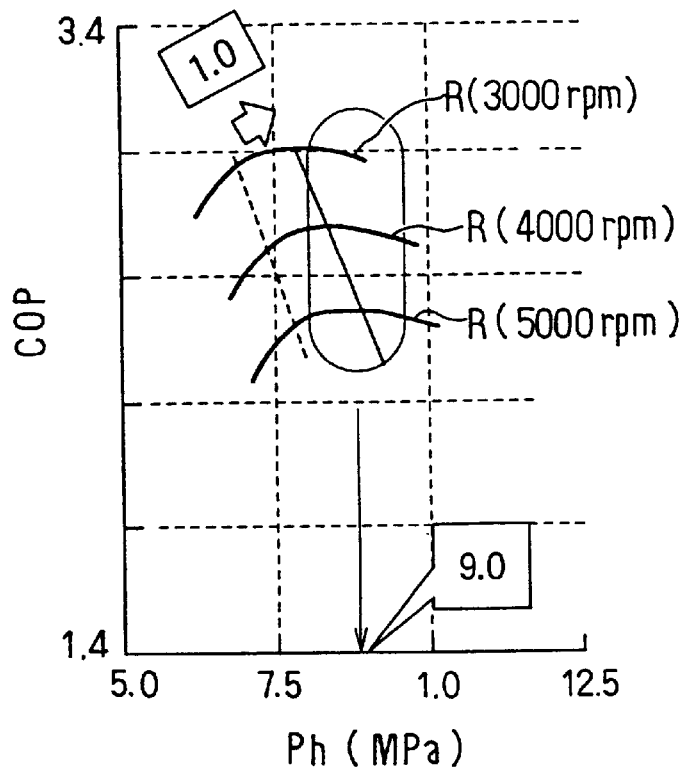
FIG. 27B is a graph showing the relationship between coefficient (COP) of performance of the refrigerant cycle and the high-pressure side refrigerant pressure Ph when the outside air temperature is –10° C., according to the eleventh embodiment of the present invention.
Figure 28A:
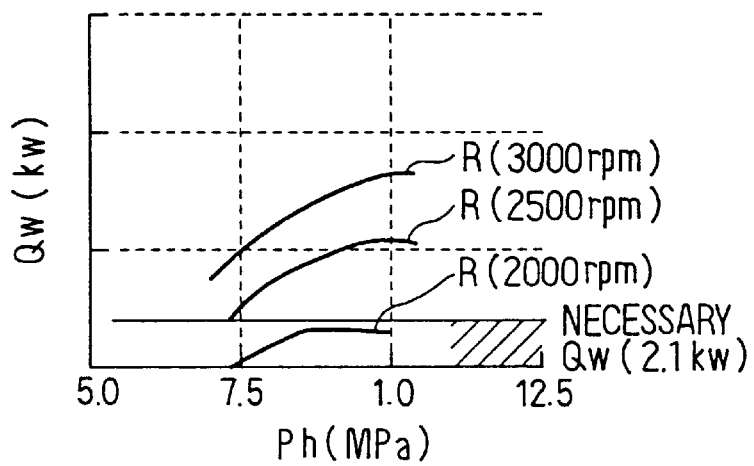
FIG. 28A is a graph showing the relationship between the heating capacity Qw and a high-pressure side refrigerant pressure Ph when an outside air temperature is 0° C.
Figure 28B:
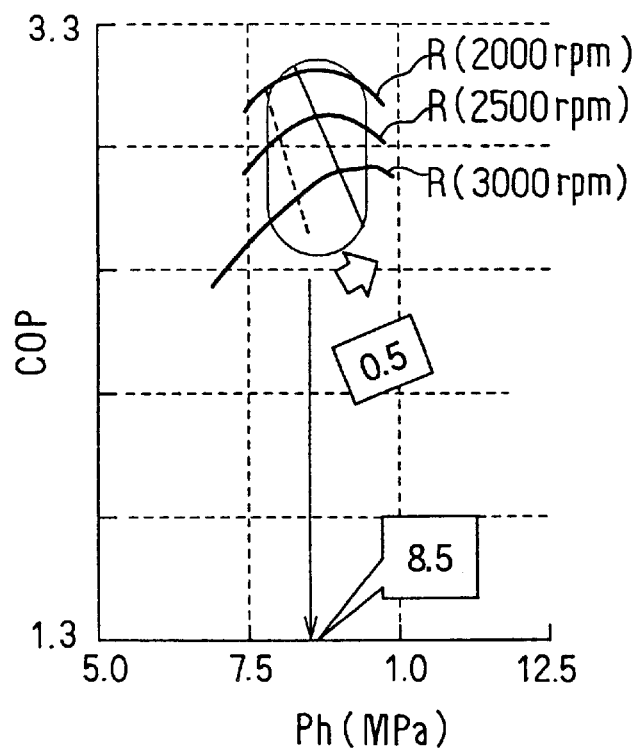
FIG. 28B is a graph showing the relationship between coefficient (COP) of performance of the refrigerant cycle and the high-pressure side refrigerant pressure Ph when the outside air temperature is 0° C., according to the eleventh embodiment of the present invention.

FIGS. 26A, 27A and 28A show the relationship between the heating capacity Qw and the high-pressure side refrigerant pressure Ph when outside air temperature Tam is −20° C., −10° C., 0° C., respectively. Further, FIGS. 26B, 27B and 28B show the relationship between the coefficient (COP) of performance of the refrigerant cycle and the high-pressure side refrigerant pressure Ph when outside air temperature Tam is −20° C.,−10° C., 0° C., respectively. As shown in FIGS. 26B, 27B and 28B, the high-pressure side refrigerant pressure Ph where the coefficient (COP) of performance of the refrigerant cycle becomes maximum relative to the outside air temperature Tam is approximately equal.

For example, in FIG. 26B, relative to the different rotation speeds (9000 rpm, 10000 rpm, 20000 rpm) of the compressor 100, the high-pressure side refrigerant pressure Ph is corrected by about 1.5 MPa based on the outside air temperature −20° C., as compared with a comparison example. In this case, the high-pressure side refrigerant pressure, where the coefficient of performance (COP) becomes larger, is approximately 9.5 MPa. When the outside air temperature is −10° C. or 0° C., the result is indicated in FIGS. 27A, 27B, 28A and 28B.

According to the eleventh embodiment of the present invention, when outside air is introduced at least into the outside air passage 810, the pressure control valve 300 is controlled so that the high-pressure side refrigerant Ph becomes the target high-pressure side refrigerant pressure determined based on the outside air temperature Tam, and the rotation speed of the compressor 100 is controlled so that the temperature Tr of air blown into the passenger compartment becomes the target temperature Tt of air. Accordingly, it is compared with a case where the pressure control valve 300 is controlled based on the temperature difference ΔT (Tg–Ta) between the refrigerant temperature Tg at the outlet side of the radiator 200 and the temperature Ta of air passing through the radiator 200, the control operation of the pressure control valve 300 becomes simple.

In the above-described embodiments of the present invention, the super-critical refrigerant cycle is applied for an air conditioner for heating or for cooling. However, the super-critical refrigerant cycle may be applied to an air conditioner in which cooling operation or heating operation can be selectively switched.

Figure 29:
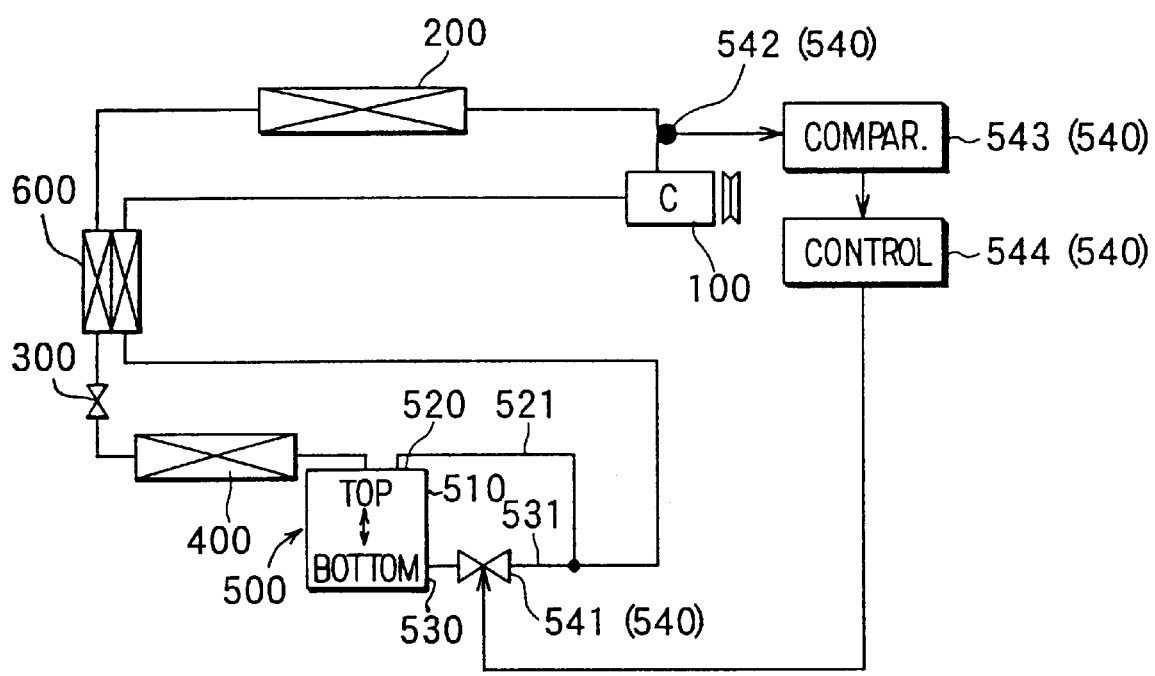
FIG. 29 is a schematic diagram of a super-critical refrigerant cycle according to a twelfth preferred embodiment of the present invention.

A twelfth preferred embodiment of the present invention will be now described with reference to FIG. 29. In the twelfth embodiment, a super-critical refrigerant cycle is 131 typically applied to a vehicle air conditioner. In the twelfth embodiment, the components similar to those of the above-described first embodiment are indicated with the same reference numbers of the first embodiment.

In the twelfth embodiment of the present invention, the compressor 100 is driven by a driving device such as a vehicle engine, and is lubricated using a lubrication oil mixed in refrigerant. Refrigerant discharged from the compressor 100 is cooled in the radiator 200, and the refrigerant pressure at the outlet side of the radiator 200 is controlled by the pressure control valve 300. Refrigerant decompressed in the pressure control valve 300 is evaporated in the evaporator 400, and refrigerant from the evaporator 400 is separated into gas refrigerant and liquid refrigerant in the accumulator 500.

In the twelfth embodiment, the accumulator 500 is mainly described. The accumulator 500 includes a tank body 510 accommodating gas refrigerant and liquid refrigerant. A first refrigerant outlet 520 through which gas refrigerant mainly flows toward the compressor 100 is provided at an upper side of the tank body 510, and a second refrigerant outlet 530 through which liquid fluid including liquid refrigerant and lubrication oil flows is provided at a lower side of the tank body 510. A large amount of lubrication oil is contained in liquid fluid from the accumulator 500. Gas refrigerant flowing from the first refrigerant outlet 520 flows into a first refrigerant passage 521, and liquid fluid flowing from the second refrigerant outlet 530 flows into a second refrigerant passage 531. Both the first and second refrigerant passages 521, 531 are joined. Low-pressure refrigerant from the accumulator 500 and high-pressure refrigerant before being decompressed in the pressure control valve 300 are heat-exchanged in an inner heat exchanger 600. By using the inner heat exchanger 600, enthalpy of refrigerant at an inlet side of the evaporator 400 is decreased, and refrigerant capacity of the super-critical refrigerant cycle can be improved.

In the twelfth embodiment, the high-pressure side refrigerant indicates refrigerant from a discharge side of the compressor 100 to an inlet side of the pressure control valve 300 before being decompressed in the pressure control valve 300. On the other hand, the low-pressure side refrigerant indicates refrigerant after being decompressed in the pressure control valve 300.

Low-pressure side refrigerant discharged from the accumulator 500 is mixed refrigerant of gas refrigerant flowing from the first refrigerant outlet 520 and liquid fluid from the second refrigerant outlet. 530. An amount of liquid fluid flowing from the second refrigerant outlet 530 is adjusted by a flow control valve 541 disposed in the second refrigerant passage 531. A refrigerant temperature sensor 542 for detecting temperature of high-pressure side refrigerant is disposed in a refrigerant passage from the refrigerant discharge side of the compressor 100 and the refrigerant inlet is side of the radiator 200.

Refrigerant temperature detected by the refrigerant temperature sensor 542 is input into a comparison device 543. When the detection temperature of the refrigerant temperature sensor 542 becomes higher than a predetermined temperature (e.g., 170° C.), the comparison device 543 outputs a signal to a control device 544 for controlling the flow control valve 541.

When the signal is input from the comparison device 543 to the control device 544, the control device 544 increases the opening degree of the flow control valve 541. On the other hand, when non signal is input from the comparison device 543 to the control device 544, the opening degree of the flow control valve 541 is decreased by the control device 544. Thus, in the twelfth embodiment, the flow control valve 541, the refrigerant temperature sensor 542, the comparison device 543 and the control device 544 construct a flow control unit 540.

According to the twelfth embodiment of the present invention, when the refrigerant temperature detected by the refrigerant temperature sensor 542 is higher than a predetermined temperature (e.g., 170° C.), the opening degree of the flow control valve 541 is increased so that lubrication oil supplied from the accumulator 500 to the compressor 100 is increased. Therefore, even when temperature of refrigerant discharged from the compressor 100 is remarkably increased, it can prevent the compressor 100 from being troubled (burned).

Because the second refrigerant outlet 530 is provided at a lower side of the tank body 510, a large amount of lubrication oil is contained in liquid fluid flowing from the second refrigerant outlet 530. When a large amount of liquid refrigerant from the accumulator 500 is sucked into the compressor 100, the compressor 100 may be troubled by liquid refrigerant in the super-critical refrigerant cycle. However, in the twelfth embodiment of the present invention, because refrigerant to be sucked into the compressor 100 is heated by the inner heat exchanger 600, liquid refrigerant is hardly sucked into the compressor 100, and a large amount of lubrication oil is sucked into the compressor 100 when the opening degree of the flow control valve 541 is increased.

Figure 30:
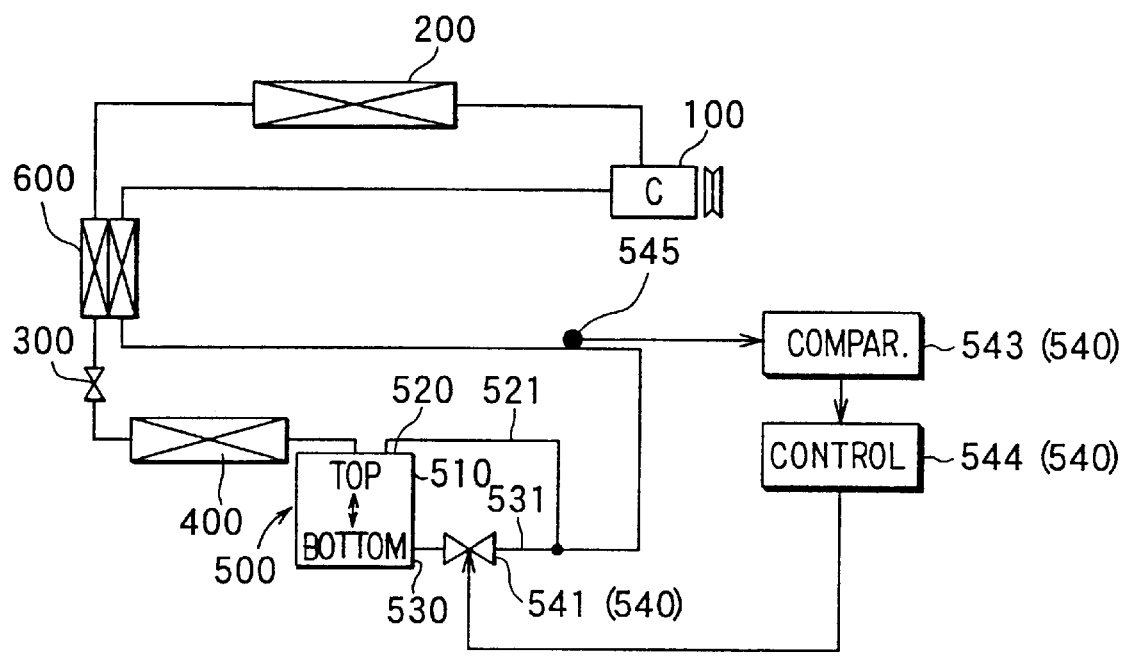
FIG. 30 is a schematic diagram of a super-critical refrigerant cycle according to a thirteenth preferred embodiment of the present invention.

A thirteenth preferred embodiment of the present invention will be now described with reference to FIG. 30. In the above-described twelfth embodiment of the present invention, when the refrigerant temperature detected by the refrigerant temperature sensor 542 is higher than a predetermined temperature, the amount of liquid fluid containing liquid refrigerant and the lubrication oil, discharged from the accumulator 500, is increased. However, in the thirteenth embodiment, a refrigerant temperature sensor 545 for detecting temperature of low-pressure side refrigerant is provided in a refrigerant passage from an outlet side of the pressure control valve 300 to an inlet side of the inner heat exchanger 600. In a vehicle travelling state of the super-critical refrigerant cycle, the low-pressure side refrigerant pressure is decreased as compared with a vehicle idling state. Thus, in the thirteenth embodiment, when the refrigerant temperature detected by the refrigerant temperature sensor 545 is equal to or lower than a predetermined temperature (about 10° C., in the thirteenth embodiment), the opening degree of the flow control valve 541 is increased so that liquid phase amount (liquid fluid amount) discharged from the accumulator 500 is increased.

Thus, in the thirteenth embodiment, the flow control valve 541, the refrigerant temperature sensor 545, the comparison device 543 and the control device 544 construct a flow control unit 540. In the thirteenth embodiment, the other parts are similar to those of the above-described twelfth embodiment of the present invention.

Figure 31:
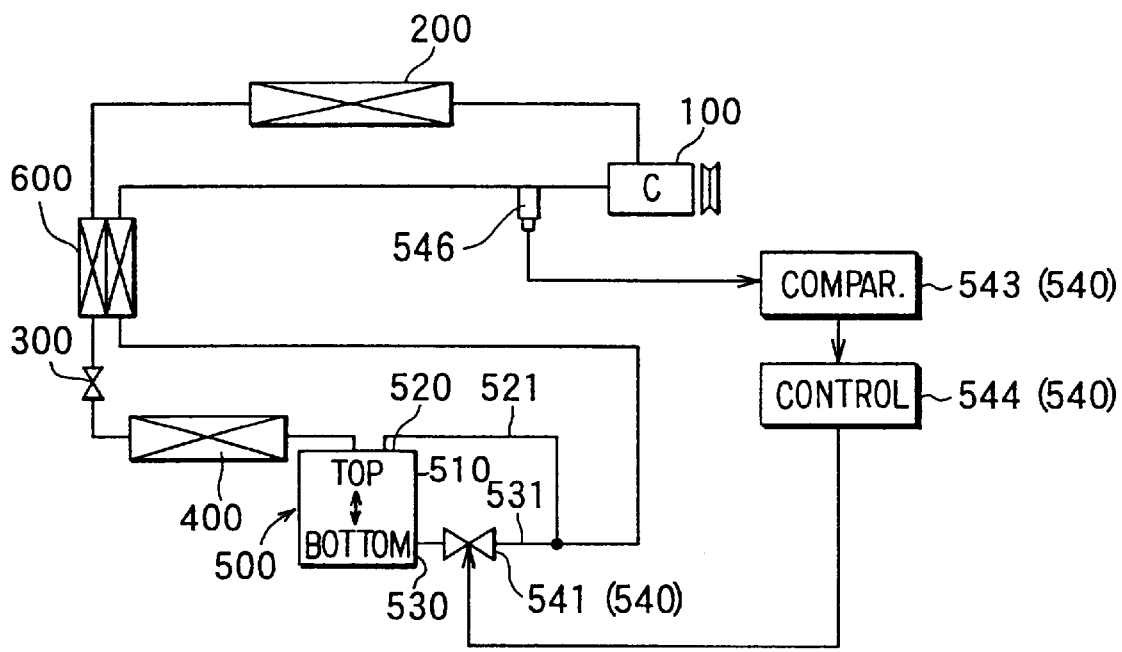
FIG. 31 is a schematic diagram of a super-critical refrigerant cycle according to a fourteenth preferred embodiment of the present invention.

A fourteenth preferred embodiment of the present invention will be now described with reference to FIG. 31. As shown in FIG. 31, a refrigerant pressure sensor 546 is disposed in the refrigerant passage from the refrigerant outlet side of the pressure control valve 300 and the refrigerant suction side of the compressor 100. Because the refrigerant pressure and the refrigerant temperature have a relationship in an any refrigerant cycle, the refrigerant pressure sensor 546 can be used instead of the refrigerant temperature sensor 545 described in the thirteenth embodiment of the present invention.

In the fourteenth embodiment, when the refrigerant pressure detected by the refrigerant pressure sensor 546 is equal to or larger than a predetermined pressure (e.g., 4.5 MPa), the opening degree of the flow control valve is increased so that the liquid phase amount discharged from the accumulator 500 is increased.

Thus, in the fourteenth embodiment, the flow control valve 541, the refrigerant pressure sensor 546, the comparison device 543 and the control device 544 construct a flow control unit 540. In the fourteenth embodiment, the other parts are similar to those of the above-described twelfth embodiment of the present invention.

Figure 32:
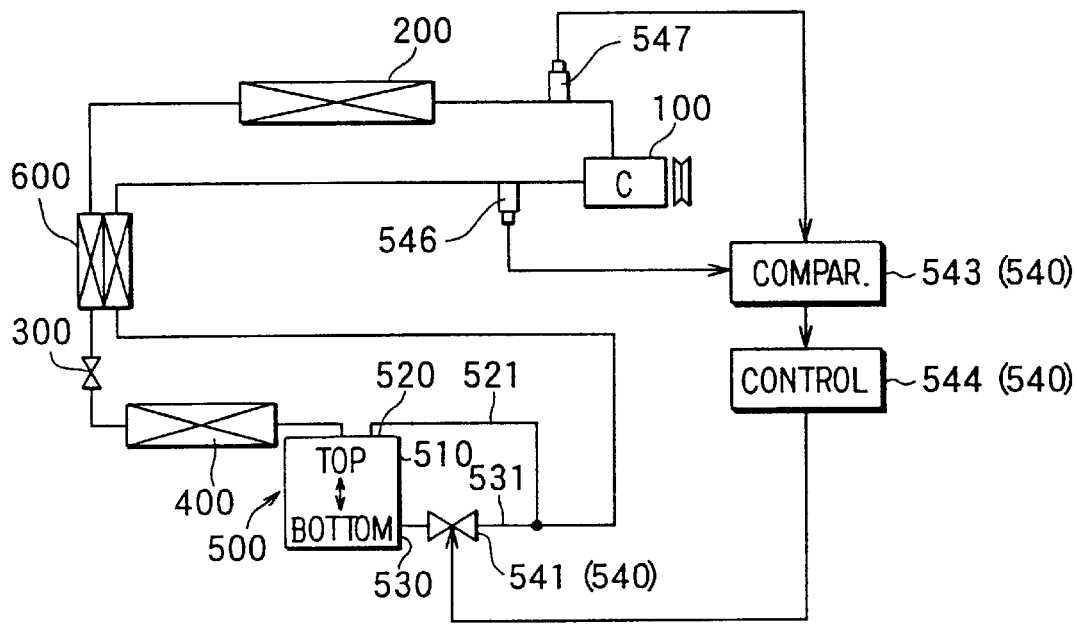
FIG. 32 is a schematic diagram of a super-critical refrigerant cycle according to a fifteenth preferred embodiment of the present invention.

A fifteenth preferred embodiment of the present invention will be now described with reference to FIG. 32. When the rotation speed of the compressor 100 is increased, a pressure difference between the high-pressure side refrigerant pressure and the low-pressure side refrigerant pressure becomes larger. In the fifteenth embodiment, as shown in FIG. 32, a high-pressure side refrigerant pressure sensor 547 is disposed in the refrigerant passage from the refrigerant outlet side of the compressor 100 and the refrigerant inlet side of the pressure control valve 300, in addition to the refrigerant pressure sensor 546 described in the fourteenth embodiment of the present invention.

In the fifteenth embodiment of the present invention, when the pressure difference between the refrigerant pressure detected by the refrigerant pressure sensor, 547 and the refrigerant pressure detected by the refrigerant pressure sensor 546 is equal to or larger than a predetermined pressure (e.g., 10 MPa), liquid phase amount flowing from the accumulator 500 is increased.

Thus, in the fifteenth embodiment, the flow control valve 541, the refrigerant pressure sensor 546, the refrigerant pressure sensor 547, the comparison device 543 and the control device 544 construct a flow control unit 540. In the fifteenth embodiment, the other parts of the refrigerant cycle are similar to those of the above-described twelfth embodiment of the present invention.

Figure 33:
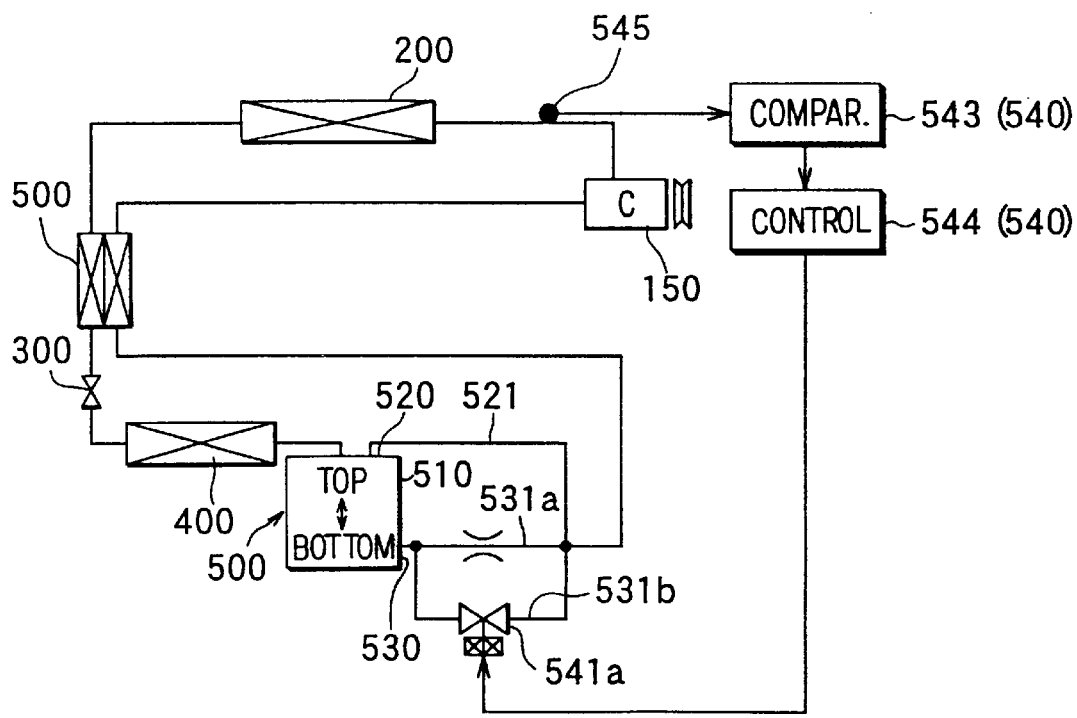
FIG. 33 is a schematic diagram of a super-critical refrigerant cycle according to a sixteenth preferred embodiment of the present invention.

A sixteenth preferred embodiment of the present invention will be now described with reference to FIG. 33. In the above-described twelfth through fifteenth embodiments, by adjusting the opening degree of the flow control valve 541, the liquid phase amount flowing from the accumulator 500 is adjusted. In the sixteenth embodiment of the present invention, plural second refrigerant passages 531*a*, 531*b* through which liquid phase refrigerant from the second refrigerant outlet 530 of the accumulator 500 flows are provided, and a switching valve 541*a* for opening and closing the second refrigerant passage 531*b* is disposed in the second refrigerant passage 531*b*. By opening and closing the switching valve 541*a*, the liquid phase amount flowing from the accumulator 500 is adjusted.

In the sixteenth embodiment of the present invention, when the refrigerant temperature detected by the refrigerant temperature sensor 542 described in the twelfth embodiment is equal to or higher than a predetermined temperature, the liquid phase amount flowing from the accumulator 500 is increased. However, in the sixteenth embodiment, the switching valve 541*a* may be controlled based on the refrigerant temperature detected by the refrigerant temperature sensor 545 of the thirteenth embodiment, the refrigerant pressure detected by the refrigerant pressure sensor 546 of the fourteenth embodiment, or the pressure difference between the high-pressure side refrigerant pressure and the low-pressure side refrigerant pressure of the fifteenth embodiment.

Thus, in the sixteenth embodiment, the switching valve 541*a*, the refrigerant temperature sensor 542, the comparison device 543 and the control device 544 construct a flow control unit 540. In the sixteenth embodiment, the other parts are similar to those of the above-described twelfth embodiment of the present invention.

Figure 34A:
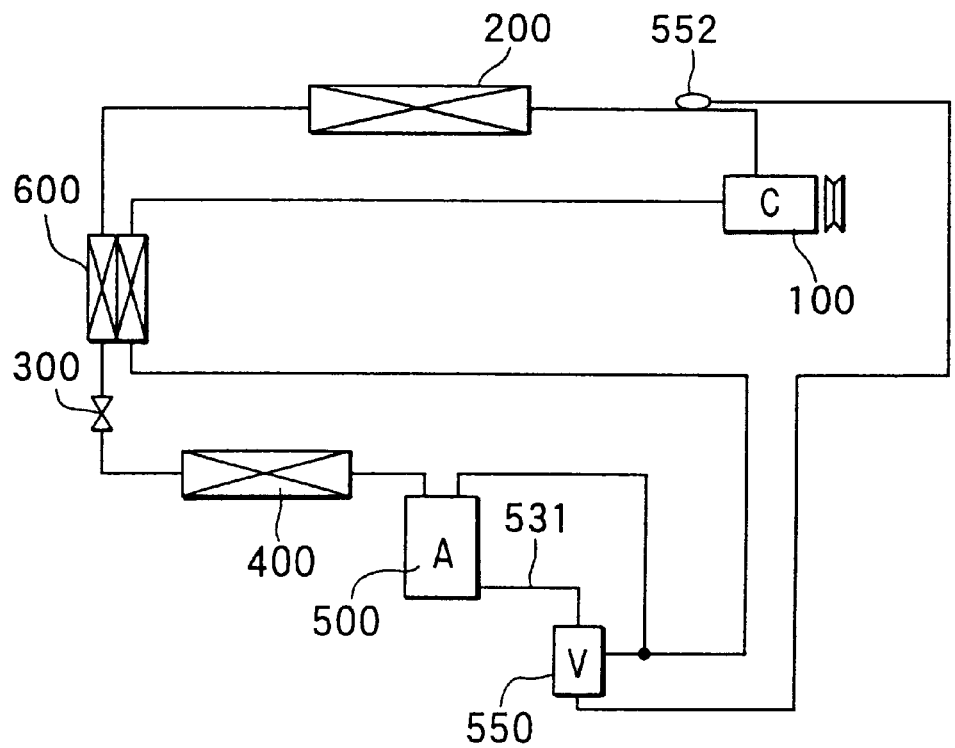
FIG. 34A is a schematic diagram of a super-critical refrigerant cycle according to a seventeenth preferred embodiment of the present invention.
Figure 34B:
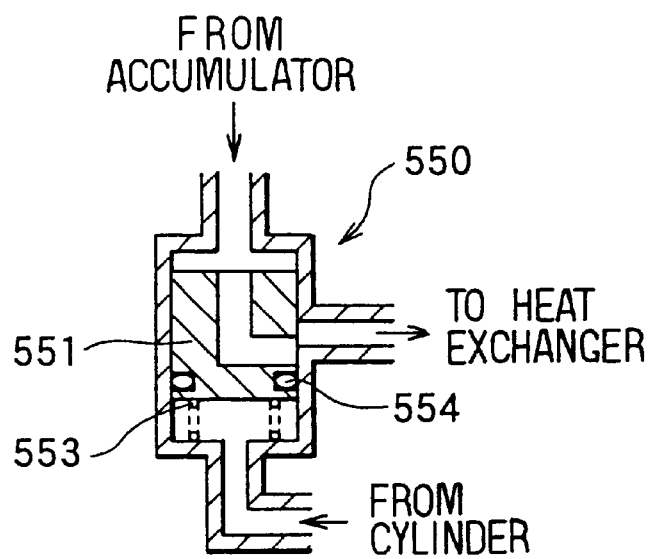
FIG. 34B is a schematic view of a mechanical flow control valve according to the seventeenth embodiment.

A seventeenth preferred embodiment of the present invention will be now described with reference to FIGS. 34A and 34B. In the seventeenth embodiment of the present invention, the liquid phase amount flowing from the accumulator 500 is mechanically adjusted. FIG. 34A is a schematic diagram of a super-critical refrigerant cycle according to the seventeenth embodiment. In the seventeenth embodiment, the liquid phase amount flowing from the accumulator 500 is adjusted based on the refrigerant pressure difference between the high-pressure side refrigerant pressure and the low-pressure side refrigerant pressure. FIG. 34B is a schematic sectional view of a flow control valve 550 for adjusting the liquid phase amount flowing from the accumulator 500.

As shown in FIG. 34B, the flow control valve 550 includes a valve body 551 which slides in a sliding direction (i.e., the up-down direction in FIG. 34B) to adjust an opening degree of the second refrigerant passage 531. A low-pressure side refrigerant pressure within the accumulator 500 is applied to one side end of the valve body 551 in the sliding direction, and an inner pressure within a thermal sensing cylinder 552 is applied to the other side end of the valve body 551 in the sliding direction. The inner pressure within the thermal sensing cylinder 552 changes in accordance with the refrigerant temperature at the refrigerant inlet side of the radiator 200. The valve body 531 is set so that the opening degree of the second refrigerant passage 531 becomes larger as the valve body 531 moves from the one side end to the other side end in the sliding direction. A spring member 553 is connected to the valve body 551 so that spring force of the spring member 553 is applied from the other side end to the one side end. A seal member 554 such as an O-ring is attached to the valve body 551 so that it can prevent pressure at both end sides of the valve body 551 in the sliding direction from being uniform.

By adjusting initial load of the spring member 553 at a predetermined load, the valve body 551 can be moved to increase the opening degree of the second refrigerant passage 531 when the pressure difference between the high-pressure side refrigerant pressure (i.e., the inner pressure of the thermal sensing cylinder 552) and the low-pressure side refrigerant pressure (i.e., the pressure within the accumulator 500) becomes larger than a predetermined pressure. Here, spring coefficient of the spring member 553 is set as small as possible.

In the seventeenth embodiment, the other parts of the refrigerant cycle are similar to those of the above-described twelfth embodiment of the present invention.

Figure 35A:
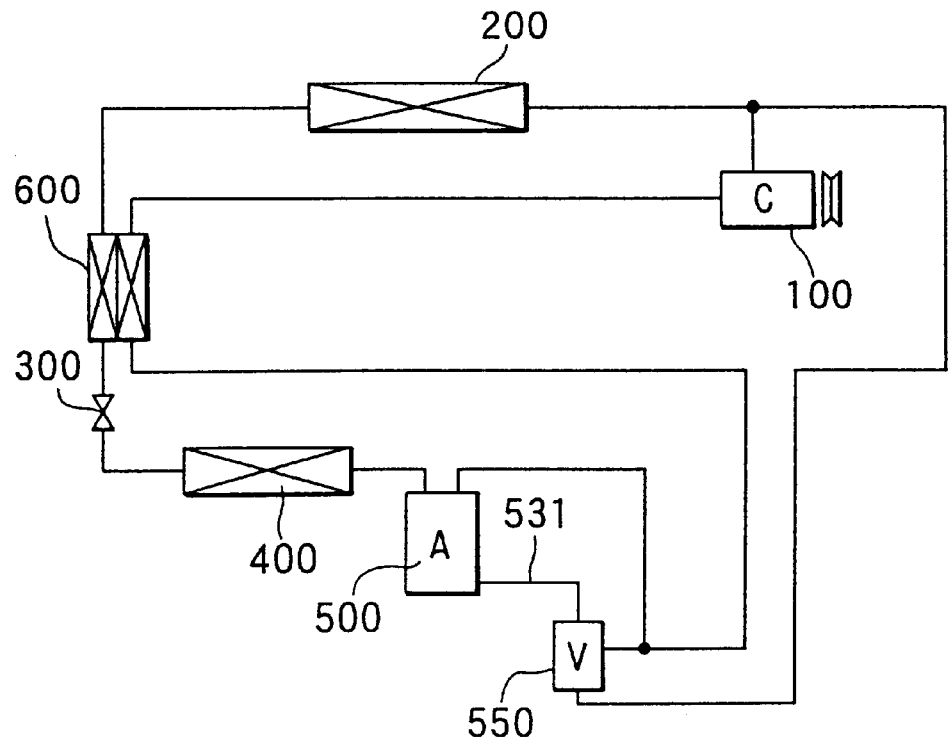
FIG. 35A is a schematic diagram of a super-critical refrigerant cycle according to an eighteenth preferred embodiment of the present invention.
Figure 35B:
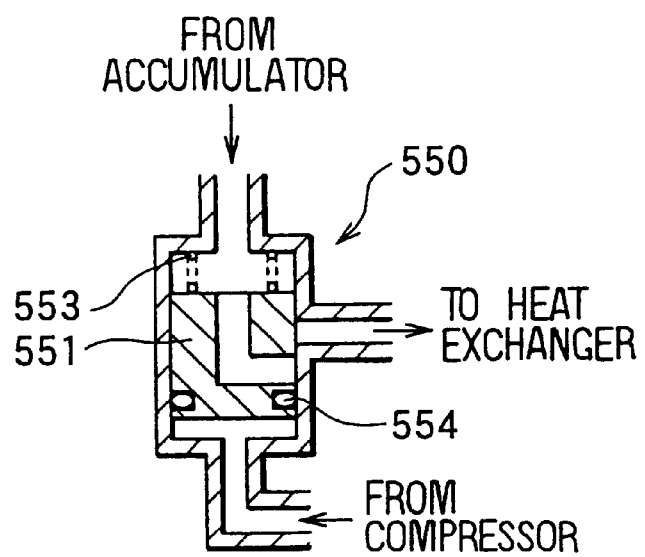
FIG. 35B is a schematic view of a mechanical flow control valve according to the eighteenth embodiment.

An eighteenth preferred embodiment of the present invention will be now described with reference to FIGS. 35A and 35B. In the above-described seventeenth embodiment of the present invention, the inner pressure within the thermal sensing cylinder 552 is applied to the other end side of the valve body 511 so that the high-pressure side refrigerant pressure is indirectly applied to the valve body 511. In the eighteenth embodiment, as shown in FIGS. 35A and 35B, the flow control valve 550 is constructed so that the refrigerant pressure discharged from the compressor 100 is directly applied to the other side end of the valve body 511 in the sliding direction.

In the eighteenth embodiment, the spring member 553 is disposed at one end side of the valve body 551 in the sliding direction so that elastic force toward the other end side in the sliding direction is applied to the valve body 551. Accordingly, the refrigerant pressure discharged from the compressor 100 is directly applied to the other end side of the valve body 511 in the sliding direction. In the eighteenth embodiment, the other parts are similar to those of the above-described twelfth embodiment of the present invention.

Figure 36A:
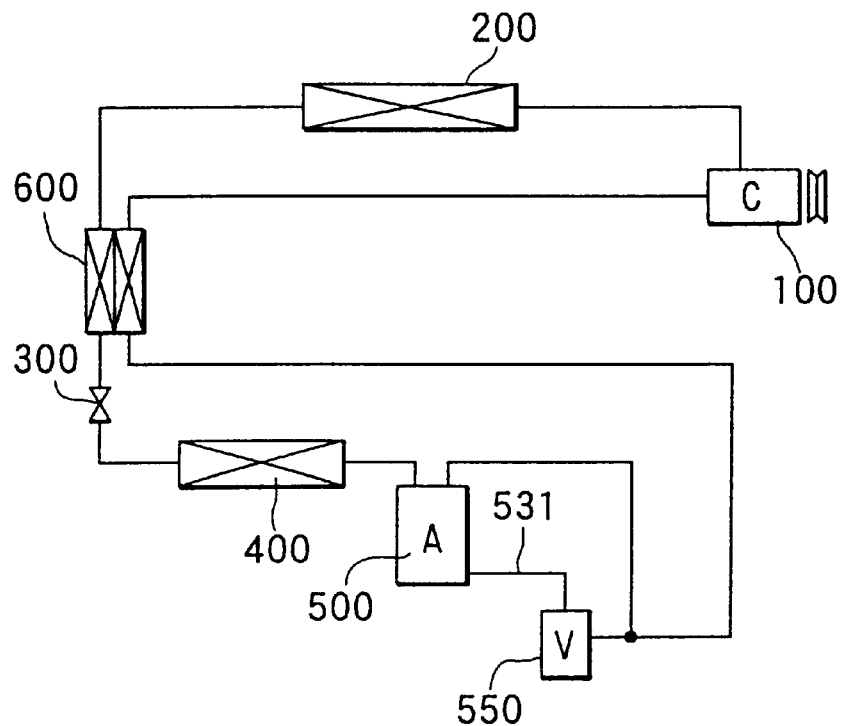
FIG. 36A is a schematic diagram of a super-critical refrigerant cycle according to a nineteenth preferred embodiment of the present invention.
Figure 36B:
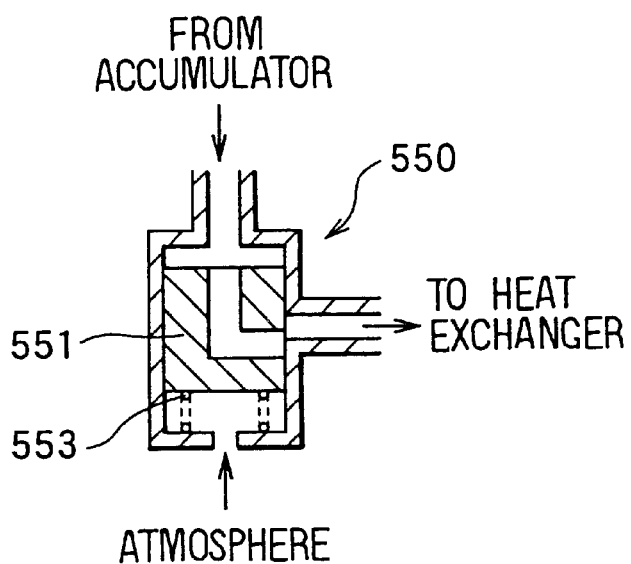

A nineteenth preferred embodiment of the present invention will be now described with reference to FIGS. 36A and 36B. In the above-described seventeenth and eighteenth embodiments, the high-pressure side refrigerant pressure is applied to the other end side of the valve body 511 in the sliding direction. However, in the nineteenth embodiment, as shown in FIGS. 36A and 36B, the other end side of the valve body 511 is opened so that the pressure of the atmosphere is applied. In this case, the liquid phase amount flowing from the accumulator 500 is adjusted based on the low-pressure side refrigerant pressure, similar to the above-described fifteenth embodiment of the present invention.

A twentieth preferred embodiment of the present invention will be now described with reference to FIGS. 37A and 37B. In the twentieth embodiment, a flow control unit for mechanically adjusting an opening degree of the second refrigerant outlet 530 is disposed within an accumulator 500.

Figure 37A:
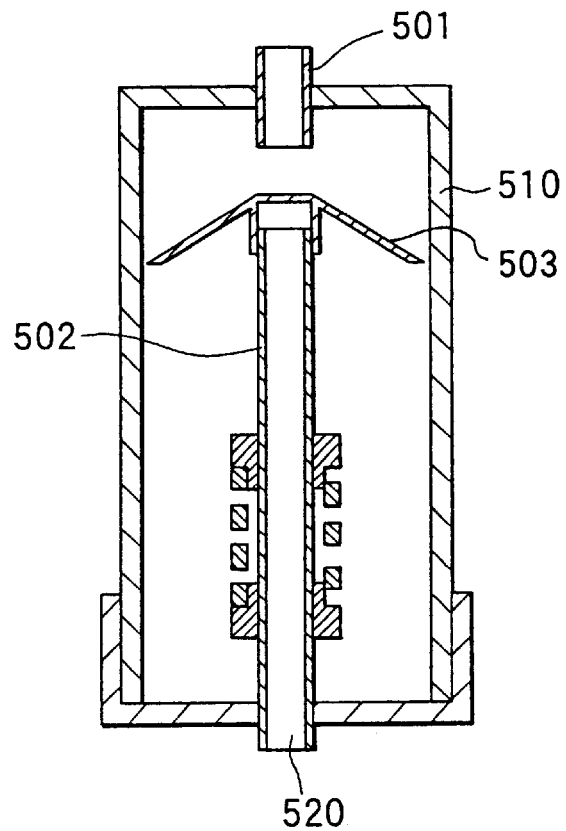
FIG. 37A is a schematic diagram of an accumulator according to a twentieth preferred embodiment of the present invention.

FIG. 37A is a schematic view of the accumulator 500 according to the twentieth embodiment. Refrigerant flowing from the evaporator 400 is introduced into a tank body 510 of the accumulator 500. Gas refrigerant at the upper side within the tank body 510 is introduced into a first refrigerant outlet 520 through a pipe 502. A mixing prevent plate 503, for preventing refrigerant flowing into the tank body 510 from being mixed to gas refrigerant, is disposed within the tank body 510.

Figure 37B:
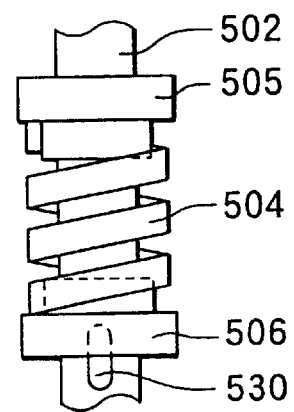
FIG. 37B is an enlarged view showing a main part of the accumulator according to the twentieth embodiment.

As shown in FIG. 37B, a second refrigerant outlet 530 is provided at a lower side of the pipe 502. The opening degree of the second refrigerant outlet 530 is adjusted by a flexible member 504 made of a shape-memory alloy or a bi-metal which is greatly expanded and contracted by the circumference temperature.

When the circumference temperature is decreased with a decrease of pressure within the accumulator 500, the flexible member 504 is contracted, and the opening degree of the second refrigerant outlet 530 is increased. On the other hand, when the circumference temperature is increased with an increase of pressure within the accumulator 500, the flexible member 504 is expanded, and the opening degree of the second refrigerant outlet 530 is decreased.

In FIG. 37B, the flexible member 504 is fixed to the pipe 502 by a stopper 505, and the second refrigerant outlet 530 is opened and closed by a movable valve 506 fixed to an end of the flexible member 504 in an axial direction.

Although the present invention has been fully described in connection with the preferred embodiments thereof with reference to the accompanying drawings, it is to be noted that various changes and modifications will become apparent to those skilled in the art.

For example, in the above-described fourth embodiment of the present invention, when the high-pressure side refrigerant temperature is higher than the predetermined temperature Tdo, any one control between the control of the refrigerant amount discharged from the compressor 100 and the control of the opening degree of the pressure control valve 300 is performed after it is determined that what one control is performed. However, both the refrigerant amount discharged from the compressor 100 and the opening degree of the pressure control valve 300 may be simultaneously controlled.

In the above-described first through eleventh embodiments, the refrigerant temperature Tg at the outlet of the radiator 200 may be calculated from a surface temperature of a refrigerant pipe or a refrigerant heat exchanger, for example.

In the above-described twelfth through twentieth embodiments, the liquid phase amount flowing from the accumulator 500 is adjusted based on a refrigerant pressure or a refrigerant temperature. The refrigerant temperature and the refrigerant pressure are changed in accordance with the rotation speed of the compressor 100. Therefore, in the above-described twelfth through twentieth embodiments of the present invention, when the rotation speed of the compressor 100 or the refrigerant amount discharged from the compressor 100 is larger than a predetermined value, the liquid phase amount flowing from the accumulator 500 may be increased.

In above-described embodiments of the present invention, other refrigerant such as ethylene, ethane and nitrogen oxide may be used. Further, in the above-described embodiments, the present invention is typically applied to a super-critical refrigerant cycle. However, the present invention may be applied to an air conditioner for a home, an unredeemable air conditioner, or a heat pump water heater.

Such changes and modifications are to be understood as being within the scope of the present invention as defined by the appended claims.

What is claimed is:

1. A refrigerant cycle system comprising:
   a refrigerant cycle in which refrigerant circulates with a heat movement, said refrigerant cycle includes:
      a compressor for compressing refrigerant, said compressor discharging refrigerant with a pressure higher than a critical pressure,
      a radiator for cooling refrigerant discharged from said compressor,
      a pressure control valve for decompressing refrigerant flowing from said radiator, said pressure control valve being disposed to control a pressure of high-pressure side refrigerant from said compressor to a position before being decompressed, and
      an evaporator for evaporating refrigerant decompressed in said pressure control valve; and
   a control unit which controls both a refrigerant amount discharged from said compressor and an opening degree of said pressure control valve based on a theoretical coefficient of performance of said refrigerant cycle and efficiency of said compressor such that an actual efficiency is maximized, the actual efficiency being the product of the theoretical coefficient of performance of said refrigerant cycle and the efficiency of said compressor.

2. The refrigerant cycle system according to claim 1, wherein said control unit controls the refrigerant amount discharged from said compressor and the opening degree of said pressure control valve based on theoretical coefficient of performance of said refrigerant cycle and efficiency of said compressor.

3. The refrigerant cycle system according to claim 1, wherein:
   said control unit includes effective coefficient calculating means for calculating effective coefficient of performance of said refrigerant cycle based on a moving heat quantity moved from said evaporator to said radiator of said refrigerant cycle and a consumed power consumed by said compressor; and
   said control unit controls the refrigerant amount discharged from said compressor and the opening degree of said pressure control valve based on the calculated effective coefficient of performance of said refrigerant cycle.

4. The refrigerant cycle system according to claim 1, wherein said control unit controls the opening degree of said pressure control valve after changing the refrigerant amount discharged from said compressor.

5. The refrigerant cycle system according to claim 1, wherein said control unit controls the refrigerant amount discharged from said compressor after changing the opening degree of said pressure control valve.

6. The refrigerant cycle system according to claim 1, wherein:

said control unit includes a refrigerant temperature detecting member for detecting temperature of the high-pressure side refrigerant; and said control unit controls at least one of the refrigerant amount discharged from said compressor and the opening degree of said pressure control valve so that the temperature detected by said refrigerant temperature detecting member is lower than a predetermined temperature.

7. The refrigerant cycle system according to claim 6, wherein:

said control unit includes determining means for determining that which one of the refrigerant amount discharged from said compressor and the opening degree of said pressure control valve is controlled when the temperature detected by said refrigerant temperature detecting member is higher than the predetermined temperature.

8. The refrigerant cycle system according to claim 1, wherein said control unit controls the refrigerant amount discharged from said compressor and the opening degree of said pressure control valve so that a driving torque of said compressor is lower than a predetermined torque.

9. The refrigerant cycle system according to claim 8, wherein:

when the driving torque of said compressor becomes the predetermined torque, said control unit controls said pressure control valve in such a manner that the pressure of the high-pressure side refrigerant becomes lower than a target pressure determined based on a refrigerant temperature at an outlet of said radiator, and controls the refrigerant amount discharged from said compressor in such a manner that cooling capacity generated by said evaporator becomes a predetermined capacity.

10. The refrigerant cycle system according to claim 8, wherein:

said compressor is driven by an electrical motor variably controlled by an inverter; and the driving torque of said compressor is detected by electrical current of said inverter.

11. The refrigerant cycle system according to claim 1, wherein:

when a temperature difference, between a refrigerant temperature at an outlet of said radiator and a temperature of a fluid passing through said radiator to perform a heat exchange with refrigerant, is equal to or larger than a predetermined temperature difference, said control unit controls said pressure control valve to have a refrigerant pressure at the outlet of said radiator, larger than a target refrigerant pressure determined based on the refrigerant temperature at the outlet of said radiator, while controlling the refrigerant amount discharged from said compressor to be decreased.

12. The refrigerant cycle system according to claim 1, wherein refrigerant circulating in said refrigerant cycle is carbon dioxide.

13. The refrigerant cycle system according to claim 1, wherein:

said refrigerant cycle further includes an accumulator having a tank portion into which refrigerant from said evaporator flows to be separated into gas refrigerant and liquid refrigerant, and a flow control member for controlling an amount of liquid fluid, including lubrication oil and liquid refrigerant, flowing from said accumulator to said compressor;

said tank portion of said accumulator has an upper outlet through which the gas refrigerant is sucked into said compressor from an upper side of said tank portion, and a lower outlet through which the liquid fluid is sucked into said compressor from a lower side of said tank portion; and said flow control member controls the amount of liquid fluid flowing from the lower side of said tank portion into said compressor.

14. The refrigerant cycle system according to claim 13, wherein said refrigerant cycle further includes an inner heat exchanger in which refrigerant from said accumulator before being sucked into said compressor and the high-pressure side refrigerant before being decompressed by said pressure control valve are heat-exchanged.

15. The refrigerant cycle system according to claim 13, wherein:

said control unit includes a refrigerant temperature detecting member for detecting temperature of refrigerant in a refrigerant passage from a discharge port of said compressor to an inlet of said radiator; and said flow control member increases an amount of the liquid fluid discharged from the lower side of said tank portion when the temperature detected by said refrigerant temperature detecting member is higher than a predetermined temperature.

16. The refrigerant cycle system according to claim 13, wherein:

said control unit includes a refrigerant temperature detecting member for detecting temperature of refrigerant in a refrigerant passage from an outlet of said pressure control valve to an inlet of said inner heat exchanger; and said flow control member increases an amount of the liquid fluid discharged from the lower side of said tank portion when the temperature detected by said refrigerant temperature detecting member is lower than a predetermined temperature.

17. The refrigerant cycle system according to claim 13, wherein:

said control unit includes a refrigerant pressure detecting member for detecting pressure of refrigerant in a refrigerant passage from an outlet of said pressure control valve to a suction port of said compressor; and said flow control member increases an amount of the liquid fluid discharged from the lower side of said tank portion when the pressure detected by said refrigerant pressure detecting member is lower than a predetermined pressure.

18. The refrigerant cycle system according to claim 13, wherein:

said control unit includes a first refrigerant pressure detecting member for detecting pressure of refrigerant in a high-pressure side refrigerant passage from a discharge port of said compressor to an inlet of said pressure control valve, and a second refrigerant pressure detecting member for detecting pressure of refrigerant in a low-pressure side refrigerant passage from an outlet of said pressure control valve to-a suction port of said compressor; and said flow control member increases an amount of the liquid fluid discharged from the lower side of said tank portion, when a pressure difference, between a refrigerant pressure detected by said first refrigerant pressure detecting member and a refrigerant pressure detected by said second refrigerant pressure detecting member, is larger than a predetermined pressure.

19. The refrigerant cycle system according to claim 1, further comprising:
- a first refrigerant pressure detection member which detects a first pressure of refrigerant discharged from said compressor, before being decompressed in said pressure control valve; and
- a second refrigerant pressure detection member which detects a second pressure of refrigerant after being decompressed in said pressure control valve;
- wherein the efficiency of said compressor is calculated based on the first pressure, the second pressure and a rotation speed of said compressor.

* * * * *